United States Patent [19]
Komatsu et al.

[11] Patent Number: 5,474,814
[45] Date of Patent: Dec. 12, 1995

[54] MAGNETIC RECORDING MEDIUM AND METHOD FOR PRODUCING THE SAME

[75] Inventors: Kazunori Komatsu; Mikio Tomaru, both of Kanagawa, Japan

[73] Assignee: Fuji Photo Film Co., Ltd., Kanagawa, Japan

[21] Appl. No.: 134,617

[22] Filed: Oct. 12, 1993

Related U.S. Application Data

[62] Division of Ser. No. 29,239, Mar. 10, 1993, abandoned.

[30] Foreign Application Priority Data

Mar. 13, 1992 [JP] Japan ........................ 4-89618
Apr. 13, 1992 [JP] Japan ........................ 4-119750

[51] Int. Cl.$^6$ .................................................. B05D 3/00
[52] U.S. Cl. .................. 427/549; 427/548; 427/599; 427/130
[58] Field of Search ........................ 427/599, 548, 427/549, 130

[56] References Cited

U.S. PATENT DOCUMENTS

| | | | |
|---|---|---|---|
| 4,447,467 | 5/1984 | Oguchi et al. ........................ | 427/549 |
| 5,034,243 | 7/1991 | Chiba et al. ........................ | 427/549 |
| 5,258,223 | 11/1993 | Inaba et al. ........................ | 428/323 |
| 5,336,559 | 8/1994 | Yamagishi et al. ................. | 427/599 |

Primary Examiner—Shrive Beck
Assistant Examiner—Katherine A. Bareford
Attorney, Agent, or Firm—Sughrue, Mion, Zinn, Macpeak & Seas

[57] ABSTRACT

A magnetic recording medium which is optimum for high-density recording in which not only orientation of magnetic particles to the direction of thickness of a magnetic layer can be performed effectively but the orientation is maintained, and a method for producing such a magnetic recording medium. The method includes the steps of multiply applying a lower layer containing inorganic powder and resin, an intermediate layer containing resin and an upper layer as a magnetic layer containing needle-shaped ferromagnetic powder onto a non-magnetic support in the condition where all the layers are wet, and drying and solidifying the layers while the ferromagnetic powder contained in the upper layer is oriented at a predetermined angle with respect to the direction of thickness of the intermediate layer. In an another embodiment, only two layers are applied to the support including a non-magnetic layer and a magnetic layer.

7 Claims, 7 Drawing Sheets

ANGLE DISTRIBUTIONS (IN THE CASE OF MAGNETIC COMPOSITION A) OF ANGULAR RATIOS IN PERPENDICULAR MAGNETIC RECORDING MEDIA

ANGLE DISTRIBUTIONS (IN THE CASE OF MAGNETIC COMPOSITION B) OF ANGULAR RATIOS IN 45° MAGNETIC RECORDING MEDIA

MAGNETIC RECORDING MEDIUM AND METHOD FOR PRODUCING THE SAME

This is a divisional of application No. 08/029,239 filed Mar. 10, 1993, now abandoned.

BACKGROUND OF THE INVENTION

The present invention relates to a method for producing a magnetic recording medium and particularly relates to a method for producing a magnetic recording medium adapted to high-density recording and having a magnetic layer in which magnetic particles have a vertical component at an arbitrary angle with respect to the direction of a support.

Heretofore, magnetic recording media such as magnetic tape, floppy disks and the like are generally produced utilizing the steps of applying a coating composition, obtained by dispersing ferromagnetic fine powder into a binder dissolved by an organic solvent, onto a belt-shaped non-magnetic support while continuously moving the support longitudinally; solidifying the coating composition by drying; and cutting or punching the resulting product into the desired size.

Particularly in recent years, the demand for increasing the information recording density per unit area of magnetic recording media has significantly increased in order to increase storage capacity of the magnetic recording media.

To increase the recording density, the write flux generated by a magnetic head must be concentrated on a small area, and the size of the magnetic head must be correspondingly reduced. With the reduction in size of the magnetic head, the quantity of flux generated is generally unavoidably reduced. Hence, the volume of the magnetic recording layer in which the direction of magnetization can be inverted by the reduced magnetic flux is necessarily smaller. If the volume of the recordingly layer is not reduced, perfect inversion of magnetization cannot be provided.

For this reason, in order increase the recording density per unit area it is necessary to reduce the thickness of the magnetic recording layer.

Other recording methods have been proposed for increasing the recording density including, for example, orienting the axis of magnetization of the magnetic layer in the direction of thickness of the magnetic medium (perpendicularly) and providing a vertical component of the axis of magnetization at a specific angle to the direction of the thickness of the recording medium. However, these methods have met with little success because the magnetic particles oriented in a predetermined manner tend to move to a position where they are arranged in the same direction as the plane of the magnetic recording medium, as in a conventional arrangement. That is, the magnetic particle tend to move after the coating process and before the magnetic particles are perfectly dried. This suggests that magnetic particles in the not-dried magnetic layer are unstable so that their orientation may be effected by factors, such as vibration associated with movement of the support, air pressure against the surface of the magnetic layer as a result of the drying process and a liquid flow phenomenon which is produced in the magnetic layer when the solvent in the magnetic layer is vaporized.

To prevent the magnetic particles from being reoriented, efforts have been made to increase the viscosity of the magnetic coating composition. In particular, Japanese Patent Publication No. Hei-3-38653 discloses a method wherein the viscosity of the magnetic coating composition was increased by preparatory drying. The biggest disadvantage associated with this method is that a relatively large amount of energy is required to maintain the orientation to any measurable degree.

As noted above, there have been proposed many methods and apparatuses in which this type orientation is completed by drying while applying a perpendicular or oblique magnetic field. An example of a convention method of this type is shown in FIG. 7.

A magnetic recording medium producing apparatus 10 shown in FIG. 7 performs a series of producing steps including an initial step of unwinding a support 3 from a delivery roll 2 and a final step of rewinding the support 3 on a take-up roll 9. The support 3 unwound from the delivery roll 2 is multiply coated with predetermined coating compositions by a multilayer coater 4. For example, the lower-layer coating composition ejected from a forward slit 5 may be an undercoat non-magnetic composition or may serve as a magnetic layer if an undercoat layer has been already applied. On the other hand, the upper-layer coating composition ejected from a rearward slit 6 may be a magnetic coating composition (in the case where the lower layer is formed from the magnetic coating composition, the upper-layer coating composition is another magnetic coating composition). After the coating step, the resulting medium is dried by a dryer 8 while a magnetic field oriented at a predetermined angle is generated by opposing magnets 7a and 7b. Thereafter, the support is rewound onto the take-up roll 9.

Thus, even in the case where the conventionally proposed method is used, the aforementioned reason makes it difficult to orient the magnetic particles in a desired direction and to fix the magnetic particles without adversely effecting the orientation of the particles.

Based on the foregoing, an object of the present invention is to provide a magnetic recording medium which is optimum for high-density recording where the magnetic particles are oriented in the direction of the thickness of the magnetic layer, as described above, and are maintained in that position. Another object of the invention is to provide a method for producing the same.

SUMMARY OF THE INVENTION

According to a first aspect of the invention, the foregoing object of the present invention can be achieved by a magnetic recording medium in which a non-magnetic support is coated with a magnetic layer containing needle-shaped or granular ferromagnetic powder, characterized in that at least three layers are laminated on the support, the three layers including a lower layer primarily having an inorganic powder and resin and provided on the support, an intermediate layer primarily containing resin and provided on the lower layer, and an upper layer provided on the intermediate layer. The upper layer constitutes the above noted magnetic layer containing the needle-shaped or granular ferromagnetic powder an end portion of which is embedded into the intermediate layer at a predetermined angle.

The same object of the present invention can be achieved by a method for producing a magnetic recording medium including the following steps: sequentially applying a lower layer containing inorganic powder and resin, an intermediate layer containing resin and an upper layer as a magnetic layer containing needle-shaped or granular ferromagnetic powder onto a non-magnetic support where all the applied layers are wet; and drying and solidifying the layers while the ferromagnetic powder contained in the upper layer is oriented at a predetermined angle with respect to the direction of thickness of the intermediate layer by a magnetic field orientation means after simultaneous multiple application of at least the intermediate layer and the upper layer onto the lower layer by an extrusion coating system.

According to another aspect of the present invention, the aforementioned problems are solved by a method for producing a magnetic recording medium by applying a magnetic coating composition onto a non-magnetic support and then orienting an axis of magnetization such that it is disposed at a specific angle with respect to a surface where the magnetic coating composition is applied, characterized in that the method further comprises the steps of: providing a magnetic layer formed from the magnetic coating composition and a non-magnetic layer formed from another coating composition on the support by simultaneous or sequential multilayer coating so that the non-magnetic layer is formed so as to be closer to the support than the magnetic layer; and hardening the respective coating compositions in the condition where magnetic particles in the magnetic layer are attracted toward the non-magnetic layer by application of a magnetic field oriented at a specific angle with respect to the coating surface of the magnetic layer and the particles are maintained by the viscosity of the non-magnetic layer having a viscosity larger than that of a composition obtained by removing magnetic particles from the magnetic layer.

DETAILED DESCRIPTION OF PREFERRED EMBODIMENTS

An embodiment of the magnetic recording medium and the method of producing the same will be described below with reference to the accompanying drawings.

Figure 3:
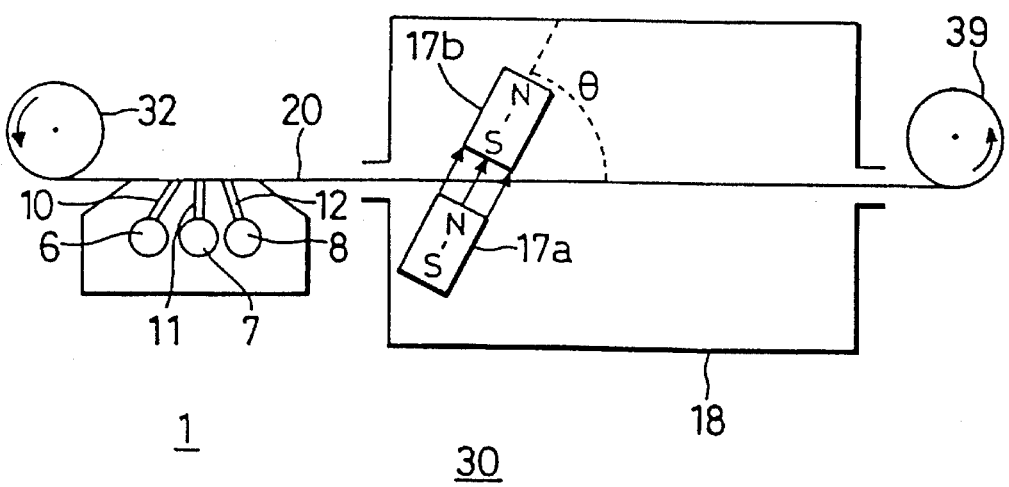
FIG. 3 is a schematic view showing an embodiment of producing equipment for producing a magnetic recording medium according to the present invention.

Referring to FIG. 3, the apparatus 30 according to the invention performs a series of producing steps beginning with the step of feeding a support 20 from a delivery roll 32 and ending with the step of taking up the support 20 on a take-up roll 39.

Figure 1:
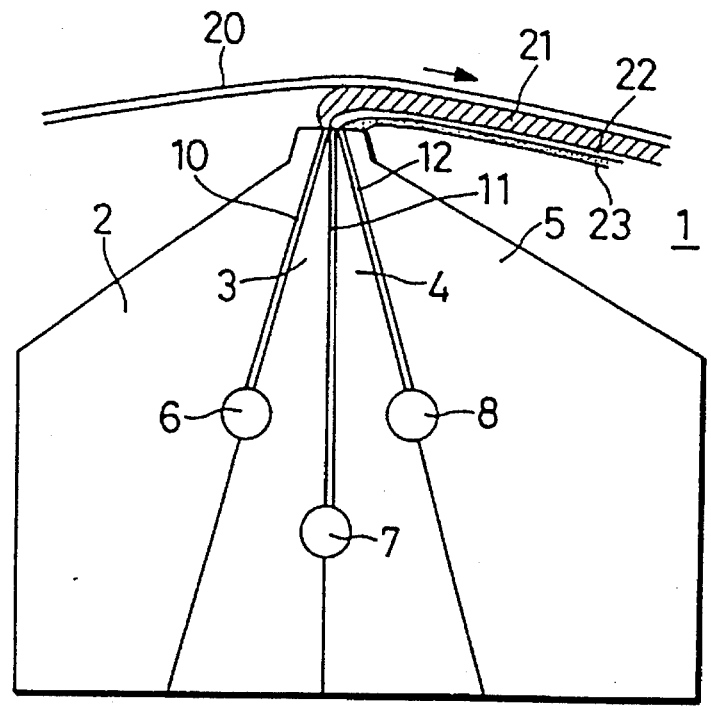
FIG. 1 is a schematic view showing an embodiment of coating apparatus for producing a magnetic recording medium according to the present invention.

FIG. 1 is a cross-sectional view of a coating head 1 for simultaneously applying three coating compositions onto the flexible support 20 of polyethylene terephthalate or the like to form a lower layer 21, an intermediate layer 22 and an upper layer 23 on the support. The coating head 1 is constituted by four blocks including a first block 2, a second block 3, a third block 4 and a fourth block 5. Slits 10, 11 and 12 are respectively formed between the blocks and liquid reservoirs 6, 7 and 8 are correspondingly provided in the respective slits. Each of the slits 10 and 12 is disposed so as to form a suitable oblique angle with respect to the slit 11.

The coating head 1 is formed of a sintered hard alloy such as tungsten carbide. The widthwise size of the head is 500 mm, the length of each of the slits 10, 11 and 12 is 80 mm and the diameter of each of the liquid reservoirs 6, 7 and 8 is approximately 15 mm. Coating is performed by pressing the coating head against the support 20 movably supported between carry rolls (not shown) with the center slit 11 opposing the support 28 and extending perpendicular therefrom.

Figure 2:
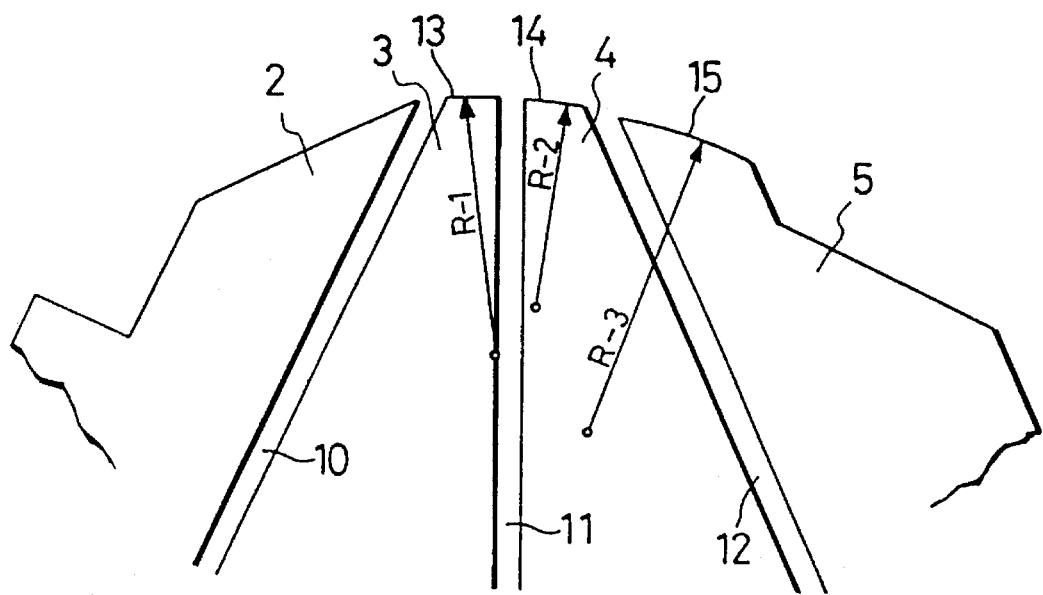
FIG. 2 is a partially enlarged view of the coating apparatus depicted in FIG. 1.

As shown in FIG. 2 in an enlarged view, doctor edge surfaces of the coating head 1 are constituted by a first doctor edge surface 13 for applying a first coating composition to form the lowermost layer, a second doctor edge surface 14 for applying a second coating composition, and a third doctor edge surface 15 for applying a third coating composition. The doctor edge surfaces 13, 14 and 15 are respectively formed as suitably curved surfaces. The radii of curvature R1, R2 and R3 can be generally set in a range from 0.5 to 10 mm and the length of each of the edge surfaces, that is, the length in the direction of the traveling of the support, may be set to range between 0.3 mm and 5 mm. Since the doctor edges have the above radii of curvature and lengths, excessive liquid pressure proximate the doctor edge surfaces can be avoided so that a suitable coating composition pressure necessary for coating can be provided.

Figure 4:
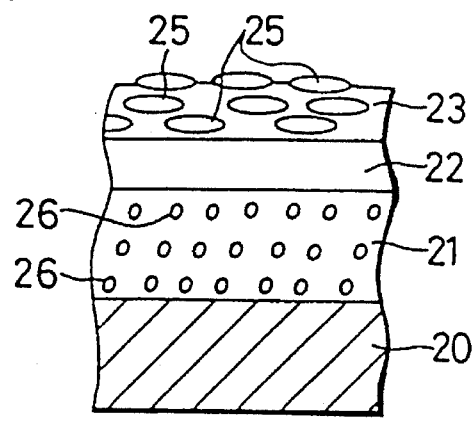
FIG. 4 is an enlarged sectional view on the magnetic recording medium in the middle of the production process according to the present invention.

As shown in FIG. 3, the support 20 withdrawn from the delivery roll 32 is multiply coated with predetermined coating compositions by the multilayer coater 1. The coating compositions are as follows. The lower-layer coating composition, that is, the lower-layer coating composition ejected from the forward slit 10, is a non-magnetic coating composition. The intermediate layer coating composition ejected from the slit 11 is a non-magnetic coating composition mainly containing a resin binder. Finally, the upper-layer coating composition, that is, the upper-layer coating composition ejected from the last slit 12, is a magnetic coating composition. After the above coating step, orientation of the magnetic particles is performed utilizing magnets 17a and 17b. The magnets 17a and 17b are disposed so that the support 20 is interposed therebetween and so that magnetic particles 25 (see FIG. 4) in the magnetic layer are oriented while being attracted toward the non-magnetic layer by a magnetic field applied at a predetermined angle (θ) to the coating films of the support 20. That is, for example, the magnets 17a and 17b are disposed so that magnetic particles 25 in the upper layer 23 are attracted toward the support.

The magnetic particles 25 are needle-shaped or granular. The oblique or perpendicular orientation of the magnetic field effects the orientation of the magnetic particles 25 so that the magnetic particles 25 are erected along the direction of orientation of the magnetic field as will be described below. Hence, the magnetic particles 25 can be arranged in a direction along the predetermined angle θ.

After the magnetic particles are correctly oriented the coating is solidified in a drying step by a dryer 18. Then, the resulting medium is subjected to additional steps such as a calendaring step (not shown) before it is wound on the take-up roll 39.

Although the apparatus 30 shown in FIG. 3 has a configuration in which the magnets 17a and 17b are disposed on the upper and lower sides of the support 20, it is to be understood that the present invention is not limited to this specific embodiment but the present invention can be applied to the case where the apparatus may have a configuration in which a magnet is disposed on the rear side of the support as long as the magnetic particles 25 can be attracted toward the support 20 by the magnet.

The non-magnetic layer or intermediate layer 22 is formed of a coating composition mainly containing a resin binder, so that the non-magnetic layer has a static viscosity larger than the viscosity of a composition obtained by removing magnetic particles 25 from the magnetic layer acting as the upper layer 23.

In this embodiment, the magnetic particles 25 in the upper, magnetic layer 23 are oriented such that they are aligned in a predetermined direction while simultaneously being attracted toward the support (i.e., toward the non-magnetic intermediate layer) by applying a magnetic field at a specific angle to the coating surface in the condition that the coated layers are not yet hardened after application of the coating compositions. The simultaneous rotational orientation and translational movement of the magnetic particles makes it easier to arrange the particles to thereby improve efficiency in orientation, compared with the conventional method where the particles are merely rotated to the desired orientation using a magnetic field.

The magnetic particles 25, attracted toward the intermediate layer 22, are maintained in the proper orientation by the viscous force of the intermediate layer 22, so that the intermediate layer is implanted with the magnetic particles 25. Therefore, the intermediate layer 22 grasps and supports the magnetic particles 25 so that the magnetic particles are retained in the proper orientation so as to not be adversely effected by factors, such as vibration, external force or the like.

Furthermore, the composition obtained by excluding magnetic particles 25 from the upper layer 23 can be made low in viscosity, so that the magnetic particles 25 can be moved easily toward the support during the orientation process. Hence, a very thin low-viscosity layer not including magnetic particles 25 is formed on the surface of the magnetic layer, so that the roughness of the layer surface created by magnetic particles 25 in the conventional method can be suppressed. Furthermore, the magnetic particles 25 projecting from the surface of the upper layer 23 can be smoothened by calendaring.

The functions and compositions of the layers will be briefly described.

The lower layer 21 can control the surface characteristics of the upper layer 23 by the quantity and size of the inorganic powder 26 in the lower layer. The lower layer 21 is applied so as to be relatively thick as compared with the other layers, so that the upper layer 23 can act as a dummy layer to facilitate thinning of the intermediate layer 22 and the upper layer 23. Furthermore, the upper layer 23 can improve the mechanical strength to heighten the stiffness of the magnetic layer and the stiffness of the tape as a whole, and, at the same time, can control the electrical conductivity and adjust the thixotropy of the respective layers to thereby improve the performance of the simultaneous multilayer coating. In the condition where the thickness $t_1$ (thickness in the dried state) of the lower layer 21 is in a range of from 0.5 to 3.5 μm, good results can be obtained. As the inorganic powder 26 in the coating composition for the lower layer 21, needle-shaped or granular carbon with a suitable size, e.g., $TiO_2$ with the mean particle size of about 0.05 μm, can be used in a range of from 30 to 70% by weight. The amount of resin can be set to a value in a range of from 30 to 70% by weight.

The intermediate layer 22 grasps and maintains the lower end portion of the magnetic particles 25 to retain the magnetic particles 25 in the proper orientation. Further, the intermediate layer also serves to improve the electrical conductivity. In the condition where the thickness $t_2$ of the intermediate layer 22 is in a range of from 0.1 to 1.8 μm, good results can be obtained. In the coating composition for the intermediate layer 22, resin in a range of from 50 to 100% by weight and inorganic powder such as carbon in a range of from 0 to 50% by weight can be mixed if necessary.

The upper layer 23 is relatively thin and contains a relatively large amount of magnetic particles 25 to improve the aptitude for high-density recording/reproduction of digital signals to thereby make high frequency output and long-term recording possible. In the condition where the thickness $t_3$ of the upper layer 23 is in a range of from 0.05 to 0.7 μm, good electromagnetic conversion characteristics can be provided. In the coating composition for the upper layer 23, about 80% by weight of needle-shaped or granular magnetic particles 25 as described above and a suitable amount of binders and other resins are suitably dispersed.

The terminology "needle-shaped or granular magnetic particles" according to the present invention means particles in which the ratio of the major axis to the minor axis in the particle form is not smaller than 1.2, preferably, not smaller than 1.5.

Figure 5:
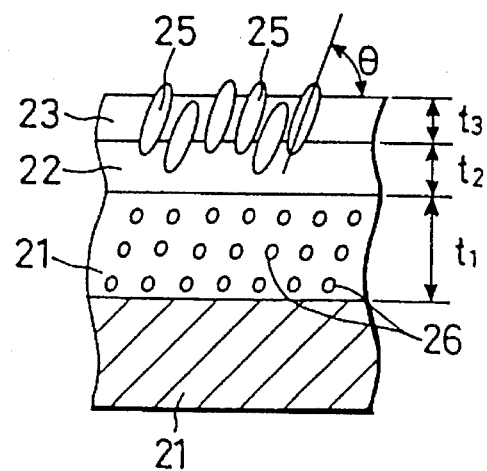
FIG. 5 is an enlarged sectional view of the magnetic recording medium according to the present invention.

In the condition where the orientation angle θ is selected to be in a range of from 10° to 90°, particularly good results can be obtained. When the orientation angle θ is selected to be in a range of from 10° to 90°, the upper end portion of the magnetic particles 25 may tend to project (see FIG. 5) from the outer surface formed of the binder, resin or the like of the upper layer 23 if the size of the magnetic particles 25 is unsuitable. Therefore, the thickness of the upper layer 23 is limited so that the upper end of the particles 25 does not protrude from the surface of the upper layer. On the other hand, the lower end of the magnetic particles 25 is forced into the intermediate layer 22 by the action of the orientation magnetic field so as to be grasped and fixed in the condition where the lower end of the magnetic particles 25 are embedded into the intermediate layer 22.

According to the present invention, any support used in conventional coating type magnetic recording media may be used as the support 20. Further, conventionally used materials as will be described later may be used as the magnetic powder, binder, solvent, additives and so on.

It is, however, necessary to consider the static viscosity of the magnetic coating composition obtained by removing magnetic particles 25 when the composition of the magnetic coating composition is decided upon. As a method for measuring the static viscosity of the magnetic composition, a composition obtained by removing magnetic particles 25 from the magnetic coating composition is prepared so that the static viscosity can be measured by a synchronous motor-driven rotation viscometer tradenamed with "VIS-METRON" and made by Shibaura System Co., Ltd.

For the purpose of fixedly planting the intermediate layer 22 with magnetic particles 25 disposed in the magnetic layer, it is preferable that the viscosity of the intermediate-layer composition 22 be selected to be higher than the viscosity of the upper layer 23 (obtained by removing magnetic particles). According to experiments performed by the present inventors, it has become clear that in order to maintain the orientation of the magnetic particles 25, preferably, the viscosity of the intermediate layer 22 should be no lower than 20 poises when it is measured by the aforementioned viscometer. Considering the process of coating, it is preferable that the viscosity not be so high at the time of coating. It is therefore effective to disperse powder of non-magnetic fine particles into the coating composition to give thixotropy to the composition.

After the three kinds of coating compositions are prepared, the coating composition for forming the lower layer 21 on the support 20, the coating composition for forming the intermediate layer 22 and the magnetic coating composition for forming the upper layer 23 are successively ejected from the slits so as to perform simultaneous multiple coating. It is to be understood that the multilayer coating method is not to be unnecessarily limited and that any one of known methods may be used.

After the coating step is performed, the intermediate layer 22 is implanted with magnetic particles 25 while the magnetic particles 25 are oriented in the upper layer 23 to an arbitrary angle θ corresponding to the purpose of use before hardening the respective layers. Hence, the magnetic particles are displaced inwardly from the upper surface of the upper magnetic layer 23 a distance which is a function of the size and orientation angle of the magnetic particles, so that a smooth, continuous layer can be formed. If materials, such as lubricants, abrasives and so on, are mixed in the continuous layer, the upper layer (the hardened continuous layer) after having been dried contributes to improvements in performance, durability and the like of the media. In the case where the magnetic particles 25 in the upper layer move toward the lower layer after the drying process, the remaining upper layer may become thicker than necessary, an obstacle to high-density recording. In this case, the thickness of the upper layer may be reduced by removing a portion of the upper layer by raking or other means. On the other hand, the particle size may be larger than the thickness of the upper layer 23. In this case, it is a matter of course that the raking of the surface as described above is not necessary.

As described above, the lower layer constituting the magnetic recording medium in the present invention is a layer mainly containing inorganic powder and resin. Hence, particularly in the case of tape type media, the stiffness of the tape required for head contact or the like can be maintained by the inorganic powder contained in the layer. The surface characteristics of the magnetic layer can be controlled by the particle form, size and quantity of the inorganic powder, so that a super-smooth surface necessary for high-density recording can be produced by making the inorganic powder out of fine particles.

Furthermore, the lower layer mainly containing the inorganic powder and resin acts as a cushion layer when the magnetic layer is filled and smoothened in the calendaring process after coating and drying. Furthermore, it is preferable that carbon black be provided in the inorganic powder for the dual purpose of preventing electrification and controlling the characteristics associated with the shear rate and viscosity.

The terminology "lower layer mainly containing inorganic powder and resin" used herein means that the sum of inorganic powder including carbon black and resin components occupies 50% by weight or more, preferably, 70% by weight or more, in all solid components except volatile components in the coating composition. In the case where magnetic particles 25 are contained in the inorganic powder, it is necessary to select the kind and quantity of the magnetic particles 25 to limit the flux density of the lower layer per se to 500 gausses or less to allow for high-frequency recording.

Specifically, examples of the inorganic powder used according to the present invention include powder of inorganic compounds such as metal oxides, metal carbonates, metal sulfates, metal nitrides, metal carbides, metal sulfides, and so on. As the inorganic compounds, α-alumina with the α ratio of not smaller than 90%, β-alumina, γ-alumina, silicon carbide, chromium oxide, cerium oxide, α-iron oxide, corundum, silicon nitride, titanium carbide, titanium oxide, silicon dioxide, tin oxide, tungsten oxide, zirconium oxide, boron nitride, zinc oxide, calcium carbonate, calcium sulfate, barium sulfate, molybdenum disulfide, and so on, may be used alone or in combination.

Specific examples of the inorganic powder used according to the present invention include: AKP-20, AKP-30, AKP-50, HIT-50 and HIT-100 made by Sumitomo Chemical Co., Ltd.; G5, G7 and S-1 made by Nippon Chemical Industrial Co., Ltd.; TF-100 and TF-120 made by Toda Kogyo Corp.; TTO-55, FT-1000, FT-2000, FTL-100, FTL-200, M-1, S-1 and SN-100 made by Ishihara Sangyo Kaisha, Ltd.; ECT-52, STT-4D, STT-30, STT-65C, Y-LOP and α-hematite obtained from Y- LOP made by Titan Kogyo K.K.; T-1 made by Mitsubishi Metal Mining Co., Ltd.; and NS-0, NS-3Y and NS-8Y made by Japan Catalytic Chemical Industry Co., Ltd.

Examples of the carbon black used according to the present invention include rubber-purpose furnace black, rubber-purpose thermal black, color-purpose black, and acetylene black. Specific examples of the carbon black used according to the present invention include: BLACK-PEARLS 2000, 1300, 1000, 900, 800, 880 and 700 and VULCAN XC-72 made by Cabot Specialty Chemicals Inc.; #3250B, #950, #650B, #970B and #850B made by Mitsubishi Chemical Industries Co., Ltd.; CONDUCTEX SC, RAVEN 8800, 8000, 7000, 5750, 5250, 9500, 2100, 2000, 1800, 1500, 1255 and 1250 made by Columbia Carbon Japan, Ltd.; and KATJEN BLACK EC made by Akzo Corp. Carbon black having a surface treated with dispersing agents, carbon black graphitized with resin or carbon black having a partly graphitized surface may be used. Or carbon black may be preliminarily dispersed with a binder before it is added to magnetic paint. These kinds of carbon black may be used alone or in combination. For example, the carbon black used according to the present invention can be determined by reference to "Carbon Black Handbook" (edited by Carbon Black Association).

Examples of the binder used according to the present invention include known thermoplastic resins, thermosetting resins, reaction-type resins such as electron beam setting type resins and ultraviolet-setting type resins, and mixtures thereof. Examples of the thermoplastic resins are resins with the glass-transition temperature of −100° to 150 ° C., with the average molecular weight of from 1000 to 200000, preferably, from 10000 to 100000, and with a polymerization degree of from about 500 to about 1000. Such examples include: polymers or copolymers containing, as constituent units, vinyl chloride, vinyl acetate, vinyl alcohol, a maleic acid, an acrylic acid, acrylic ester, vinylidene chloride, acrylonitrile, a methacrylic acid, methacrylic ester, styrene, butadiene, ethylene, vinylbutyral, vinylacetal, vinyl ether, and so on; polyurethane resins; and various kinds of rubber resins. Examples of the thermosetting resins or reaction type resins include phenol resins, epoxy resins, polyurethane hardening type resins, urea resins, melamine resins, alkyd resins, acrylic reaction type resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate.

These resins have been described in detail in "Plastic Handbook" published by Asakura Shobo. Any one of known electron beam setting type resins may be used. Examples thereof and the methods for production thereof have been described in detail in Japanese Patent Unexamined Publication No. Sho-62-256219. The aforementioned resins may be used alone or in combination. The preferred example thereof is a combination of at least one member selected from the group of vinyl chloride resin, vinyl chloride- vinyl acetate resin, vinyl chloride-vinyl acetate-vinyl alcohol resin and vinyl chloride-vinyl acetate-maleic anhydride copolymer and polyurethane resin or a combination obtained by adding polyisocyanate thereto.

With respect to the structure of polyurethane resin, known structures of polyester polyurethane, polyether polyurethane, polyether polyester polyurethane, polycarbonate polyurethane, polyester polycarbonate polyurethane, polycaprolactone polyurethane and so on may be used. At least one polar group selected from COOM, $SO_3M$. $OSO_3M$, $P=O(OM)_2$, $O-P=O(OM)_2$ (in which M represents hydrogen atom or alkali metal salt group ), OH, $NR^2$, $N^+R^3$ (in which R represents hydrocarbon group), epoxy group, SH, CN and so on may be preferably introduced into the all binders described above by copolymerization or addition reaction. The quantity of such polar group is $10^{-1}$ to $10^{-3}$ mol/g, preferably, $10^{-2}$ to $10^{-6}$ mol/g.

Specific examples of the binders used according to the present invention include: VAGH, VYHH, VMCH, VAGF, VAGD, VROH, VYES, VYNC, VMCC, XYHL, XYSG, PKHH, PKHJ, PKHC and PKFE made by Union Carbide Corp.; MPR-TA, MPR-TA5, MPR-TAL, MPR-TSN, MPR-TMF, MPR-TS and MPR-TM made by Nissin Chemical Industry Co., Ltd.; 1000W, DX80, DX81, DX82 and DX83 made by Denki Kagaku Kogyo K.K.; MR110, MR100 and 400X110A made by Nippon Zeon Co., Ltd.; NIPPOL-LANN2301, N2302 and N2304 made by Nippon Polyurethane Industry Co., Ltd.; Pandex T-5105, T-R3080, T-5201, BURNOCK D-400, D-210-80, CRISVON 6109 and 7209 made by Dai Nippon Ink & Chemicals, Inc.; BYLON UR8200, UR8300, RV530 and RV 280 made by Toyobo Co., Ltd.; DIFERAMIN 4020, 5020, 5100, 5300, 9020, 9022 and 7020 made by Dainichiseika Color & Chemicals Mfg. Co., Ltd.; MX5004 made by Mitsubishi Chemical Industries Ltd.; SANPRENE SP-150 made by Sanyo Chemical Industries Ltd.; and SARAN F310 and F210 made by Asahi Chemical Industry Co., Ltd.

The intermediate layer mainly containing resin acts to solidify the needle-shaped ferromagnetic powder contained in the upper layer by orientation process including magnetic field attraction. Although the magnetic powder condition where magnetic particles individually penetrate the intermediate layer is most suitable to high-density recording, the present invention can be applied to the case where the magnetic powder may be merely mixed with the intermediate layer.

To constitute the aforementioned condition, it is necessary to increase the static viscosity of the intermediate layer to be as high as possible and still be able to act as a coating. Preferably, therefore, the static viscosity is selected so as to be not lower than 20 centipoises.

The terminology "intermediate layer mainly containing resin" used herein means that resin components occupies 50% by weight or more considering all the solid components except volatile components in the coating composition. Other components such as lubricants and inorganic powder including carbon black, as described above, may be contained in the intermediate layer. Materials including reaction type resins such as EB setting resins and ultraviolet-setting resins as used in the lower layer may be used as the resin in this layer. If the aforementioned function is satisfied, it is unnecessary to increase the thickness. The thickness may be set so as to be not larger than 1 μm, preferably, not larger than 0.5 μm.

Examples of the needle-shaped or granular ferromagnetic powder for the overcoat recording layer are known needle-shaped or granular particles such as ferromagnetic alloy fine powder mainly containing $\gamma$-$Fe_2O_X$ (X=1.33 to 1.5), Co-modified $\gamma$-$Fe_2O_X$ (X=1.33 to 1.5), Fe, Ni or Co. These kinds of ferromagnetic powder may contain other elements such as Al, Si, etc. or may be pretreated with dispersing agents, lubricants, surface active agents, antistatic agents and the like. Because the layer must be filled with ferromagnetic powder. As much as possible to achieve high-density recording, the quantities of additives such as resins, abrasives, lubricants and so on are limited to the minimum. Furthermore, with respect to the thickness of the overcoat recording layer, it is necessary to set the saturation flux in a range of from 0.01 to 0.30 Maxwell.

The binder used in the overcoat magnetic layer according to the present invention is used in an amount of from 5 to 50% by weight, preferably, in an amount of from 10 to 30 by weight, relative to the ferromagnetic powder. In the case where vinyl chloride resin is used, it is preferably used in an amount of from 5 to 30% by weight. In the case where polyurethane resin is used, it is preferably used in an amount of from 2 to 20% by weight. Polycyanate is preferably used in an amount of from 2 to 20% by weight. These binders may be preferably used in combination in the aforementioned ranges.

In the case where polyurethane is used according to the present invention, polyurethane with a glass transition temperature of −50° to 100° C., a shearing expansion of 100 to 2000%, a shearing stress of 0.05 to 10 kg/cm$^2$ and a yield point of 0.05 to 10 kg/cm$^2$ is preferably used. The magnetic recording medium according to the present invention has three layers. Accordingly, it is a matter of course that the quantity of binder, the quantity of vinyl chloride resin, polyurethane resin, polyisocyanate or other resins contained in the binder, the molecular weight of each resin for forming the magnetic layer, the quantity of polar group or physical properties as described above can be changed in each of the layers if necessary.

Examples of the polycyanate used according to the present invention include: isocyanates such as tolylenediisocyanate, 4- 4'-diphenylmethanediisocyanate, hexamethylenediisocyanate, xylylenediisocyanate, naphthylene-1,5-diisocyanate, ortho-toluic diisocyanate, isophoronediisocyanate, triphenylmethanetriisocyanate, and so on; products of these isocyanates and polyalcohol; and polyisocyanates produced by condensation of these isocyanates. Examples of the tradenames of these isocyanates on the market include: CORONATE L, CORONATE HL, CORONATE 2030, CORONATE 2031, MILLIONATE MR and MILLIONATE MTL made by Nippon Polyurethane Industry Co., Ltd.; TAKENATE D-102, TAKENATE D-110N, TAKENATE D-200 and TAKENATE D-202 made by Takeda Chemical Industries Ltd.; and DESMODUR L, DESMODUR IL, DESMODUR N and DESMODUR EL made by Sumitomo-Bayer Urethane Co., Ltd. These may be used both in the lower non-magnetic layer and in the upper recording layer singly or in combination with two or more by using difference in hardening response.

Examples of the carbon black used in the upper recording layer, that is, in the magnetic layer, according to the present invention include rubber-purpose furnace black, rubber-purpose thermal black, color-purpose black, and acetylene black. Carbon black with the specific area of from 5 to 500 $m^2/g$, with the DBP oil absorption of from 10 to 400 ml/100 g, with the particle size of from 5 m$\mu$m to 300 m$\mu$m, with pH of from 2 to 10, with percentage of water content of from 0.1 to 10% and with the tap density of from 0.1 to 1 g/cc is preferable. Specific examples of the carbon black used according to the present invention include: BLACK-PEARLS 2000, 1300, 1000, 900, 800, 700 and VULCAN XC-72 made by Cabot Specialty Chemicals Inc.; #80, #60, #55, #50 and #35 made by Asahi Carbon Co., Ltd.; #2400B, #2300, #900, #1000, #30, #40 and #10B made by Mitsubishi Chemical Industries Ltd.; and CONDUCTEX SC, RAVEN 150, 50, 40 and 15 made by Columbia Carbon Corp. Carbon black having a surface treated with dispersing agents, carbon black graphitized with resin or carbon black having a partly graphitized surface may be used. Or carbon black may be preliminarily dispersed with a binder before it is added to magnetic paint. These kinds of carbon black may be used singly or in combination. In the case where carbon black is used, it is preferably used in an amount of 0.1 to 30% with respect to the amount of the ferromagnetic powder. Carbon black functions to prevent electrification of the magnetic layer, reduce the friction coefficient, add shading characteristics, improve film strength, and so on. These functions vary according to the kind of the carbon black used. Accordingly, it is a matter of course that these kinds of carbon black used according to the present invention can be selectively used correspondingly to the purposes on the basis of the aforementioned characteristics such as particle size, oil absorption, electrical conductivity, pH and so on by changing the kind, quantity and combination in each of the first and second layers, that is, the lower non-recording layer and the upper recording layer. For example, electrification can be prevented by using electrically high conductive carbon black in the lower layer and, on the other hand, friction coefficient can be reduced by using carbon black of a large particle size in the upper recording layer. For example, the carbon black used according to the present invention can be determined by reference to "Carbon Black Handbook" (edited by Carbon Black Association).

As the abrasives used in the upper recording layer according to the present invention, known materials having hardness of not smaller than 6 in Mohs scale, such as $\alpha$-alumina with the $\alpha$ ratio of not smaller than 90%, $\beta$-alumina, silicon carbide, chromium oxide, cerium oxide, $\alpha$-iron oxide, corundum, artificial diamond, silicon nitride, silicon carbide, titanium carbide, titanium oxide, silicon dioxide, boron nitride, and so on, are mainly used alone or in combination. Composite materials formed of these abrasives (by surface-treating an abrasive material with another abrasive material) may be used. These abrasives may contain other compounds or elements than the main components, but the same effect can be achieved if the main components occupy 90% or more. The mean particle size of these abrasives is preferably in a range of from 0.01 to 2 $\mu$m, but the same effect can be provided by using abrasives different in particle size in combination if necessary or by widening the particle size distribution even in the case where one abrasive material is used alone. Abrasives with a tap density of from 0.3 to 2 g/cc, a percentage of water content of from 0.1 to 5%, a pH of from 2 to 11 and a specific area of from 1 to 30 $m^2/g$ are preferable. Any one of a needle-shaped, ball-shaped and dice-shaped abrasives may be used according to the present invention, but abrasives partly angularly-shaped are preferable in that they have excellent abrasive characteristics.

Specific examples of the abrasives used according to the present invention include: AKP-20, AKP-30, AKP-50 and HIT-50 made by Sumitomo Chemical Co., Ltd.; G5, G7 and S-1 made by Nippon Chemical Industrial Co., Ltd.; and 100ED and 140ED made by Toda Kogyo Corp. It is a matter of course that the abrasives used according to the present invention can be selectively used correspondingly to the purposes by changing the kind, quantity and combination in each of the layers. These abrasives may be added to the magnetic paint after preliminarily dispersed with a binder. The number of abrasives being present on the upper recording layer surface and upper recording end surface of the magnetic recording medium according to the present invention is preferably not smaller than 5 per 100 $\mu m^2$.

Abrasives having lubricating effects, antistatic effects, dispersing effects, plastic effects, and so on, are used as the abrasives to be used according to the present invention. Examples of the abrasives include molybdenum disulfide, tungsten disulfide, graphite, boron nitride, black coal fluoride, silicone oil, silicone having a polar group, fatty acid modified silicone, fluorine-containing silicone, fluorine-containing alcohol, fluorine-containing ester, polyolefin, polyglycol, alkyl phosphoric ester and alkali metal salt thereof, alkyl sulfuric ester and alkali metal salt thereof, polyphenyl ester, fluorine- containing alkyl sulfuric ester and alkali metal salt thereof, monobasic fatty acids (which may contain any unsaturated bond or may have branch connection), and metal salts thereof (such as Li, Na, K, Cu, and so on), monohydric, dihydric, trihydric, tetrahydric, pentahydric and hexahydric alcohols (which may contain any unsaturated bond or may have branch connection) having from 12 carbon atoms to 22 carbon atoms, alkoxy alcohols having from 12 carbon atoms to 22 carbon atoms, mono-, di- or tri-fatty acid ester constituted by monobasic fatty acid (which may contain any unsaturated bond or may have branch connection) having from 10 carbon atoms to 24 carbon atoms and at least one of monohydric, dihydric, trihydric, tetrahydric, pentahydric and hexahydric alcohols (which may contain any unsaturated bond or may have branch connection) having from 2 carbon atoms to 12 carbon atoms, fatty acid ester of monoalkyl ether of alkylene oxide polymer, fatty acid amide having from 8 carbon atoms to 22 carbon atoms, and aliphatic amine having from 8 carbon atoms to 22 carbon atoms. Specific examples thereof include a lauric acid, a myristic acid, a palmitic acid, a stearic acid, a behenic acid, a butyl stearate, an oleic acid, a linolic acid, a linolenic acid, an elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, nonion surface active agents such as alkylene oxide, glycerine, glycidol, alkylphenolethylene oxide addition product, and the like; cathion surface active agents such as cyclic amine, ester amide, quanternary ammonium salts, derivatives of hydantoin, heterocyclic compounds, phosphonium or sulfonium compounds, and the like; anion surface active agents such as a carboxylic acid, a sulfonic acid, a phosphoric acid, a sulfuric ester group, a phosphoric ester group, and so on; and amphoteric surface active agents such as amino acids, aminosulfonic acids, sulfuric or phosphoric esters of aminoalcohol, alkyl betaines, and so on, may be used. These surface active agents have been described in "Surface Active Agent Handbook" (published by Sangyo Tosho Co., Ltd.). These lubricants, antistatic agents, and the like, do not need to be perfectly pure and may contain impurities such as isomers, unreacted residues, side reaction products, decomposed matters, oxides, and the like, besides the main components. The amount of these impurities is preferably not larger than 30%, and more preferably, not larger than 10%.

These lubricants and surface active agents used according to the present invention can be used selectively in regard to the kind and quantity thereof in each of the layers, if necessary. For example, bleeding to the surface is controlled by using fatty acids having different melting point in the respective layers. Bleeding to the surface is controlled by using esters having different boiling points or polarity. Although it is also considered that the stability of coating is improved by adjusting the quantity of the surface active agent and that the lubricating effect is improved by increasing the amount of the lubricant in the lower non-recording layer, it is a matter of course that the purpose of use thereof is not limited to the aforementioned examples.

All or part of the additives used according to the present invention may be added at any time during the magnetic paint producing process. For example, the present invention can be applied to any of the cases where the additives may be mixed with ferromagnetic powder before the kneading process; added in the process of kneading ferromagnetic powder, binder and solvent; added after dispersion; added just before coating; and the like. Examples of the tradenames of these lubricants used according to the present invention include: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor Hardening Fatty Acid, NAA-42, NAA-44, CATHION SA, CATHIONMA, CATHIONAB, CATHION BB, NYMEEN L-201, NYMEEN L-202, NYMEEN S-202, NONION E-208, NONION P-208, NONION S-207, NONION K-204, NONION NS-202, NONION NS-210, NONION HS-206, NONION L-2, NONION S-2, NONION S-4, NONION O-2, NONION LP-20R, NONION PP-40R, NONION SP-60R, NONION OP-80R, NONION OP-85R, NONION LT-221, NONION ST-221, NONION TO-221, MONOGLY MB, NONION DS-60, ANON BF, ANON LG, BUTYL STEARATE, BUTYLSAURATE and ERUCIC ACID made by Nippon Oils & Fats Co., Ltd.; OLEIC ACID made by Kanto Cemical Co., Inc.; FAL-205 and FAL-123 made by Takemoto Oil & Fat Co., Ltd.; N-JLUB LO, N-JLUB IPM and PLASTICIZERS E4030 made by New Japan Chemical Corp.; TA-3, KF-96, KF-96L, KF-96H, KF410, KF420, KF965, KF54, KF50, KF56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910 and KF-3935 made by Shin-etsu Chemical Industry Co., Ltd.; ARMIDE P, ARMIDE C and ARMOSLIP CP made by Lion-Armor Co., Ltd.; DUOMIN TDO made by Lion Fat & Oil Co., Ltd.; BA-41G made by Nisshin Oil Millls Ltd.; and PROFAN 2012E, NEWPOLE PE61, IONET MS-400, IONET MO-200, IONET DL-200, IONET DS-300, IONET DS-1000 and IONET DO-200 made by Sanyo Chemical Industries Ltd.

The organic solvents of the present invention can be used in arbitrary proportions. Examples of the organic solvents used include: ketones such as acetone, methyl ethyl ketone, methyl isobutyl ketone, diisobutyl ketone, cyclohexanone, isophorone, tetrahydrofuran, and so on; alcohols such as methanol, ethanol, propanol, butanol, isobutyl alcohol, isopropyl alcohol, methyl cyclohexanol, and so on; esters such as methyl acetate, butyl acetate, isobutyl acetate, isopropyl acetate, ethyl lactate, glycol acetate, and so on; glycol ethers such as glycol dimethyl ether, glycol monoethyl ether, dioxane, and so on; aromatic hydrocarbons such as benzene, toluene, xylene, cresol, chlorobenzene, and so on; chlorinated hydrocarbons such as methylene chloride, ethylene chloride, carbon tetrachloride, chloroform, ethylene chlorohydrin, dichlorobenzene, and so on; N,N-dimethyl formamide; and hexane. These organic solvents do not need to be perfectly pure and may contain impurities such as isomers, unreacted residues, side reaction products, decomposed matters, oxides, water, and so on, besides the main components. The amount of these impurities is preferably not larger than 30%, more preferably, not larger than 10%. These organic solvents used according to the present invention can be used selectively as to the kind and quantity thereof in each of the layers, if necessary. Improvement of surface characteristics by using a high-volatile solvent in the lower layer, improvement of stability of coating by using a high surface tension solvent (such as cyclohexane, dioxane, and the like) in a relatively lower layer, improvement of the degree of filling by using a solvent high in dissolving parameter in the upper recording layer, and so on, are considered as examples of the selection, but it is a matter of course that the purpose of use thereof is not limited to the aforementioned examples.

A backcoat layer may be provided on the non-magnetic support on a side opposite to the magnetic layer side. The thickness of the backcoat layer is in a range of from 0.1 to 2 μm, preferably, in a range of from 0.3 to 1.0 μm. Known materials may be used as the undercoat and backcoat layers:

The following materials may be used as the non-magnetic support used according to the present invention: known films formed of polyesters such as polyethylene terephthalate, polyethylene naphthalate, and so on; polyolefins, cellulose triacetate, polycarbonate, polyamide, polyimide, polyamide-imide, polysulfone, aramide, aromatic polyamide. These supports may be preliminarily subjected to corona discharge treatment, plasma treatment, liquid adhesion treatment, thermal treatment, dust collection treatment, and so on. To achieve the object of the present invention is necessary that materials with a center line average surface roughness of not larger than 0.03 μm, preferably, not larger than 0.02 μm, and more preferably, not larger than 0.01 μm, are used as the non-magnetic supports. Furthermore, it is preferable that not only the non-magnetic supports have a small amount of center line average surface roughness but the non-magnetic supports have no rough projections of 1 μm or more. The rough form of the surface can be freely controlled by the size and quantity of fillers added to the supports as occasion demands. Examples of the fillers include: oxides of Ca, Si, Ti, etc.; carbonates thereof; and organic fine powder of acrylic compounds, etc. In the non-magnetic supports used according to the present invention, the F-5 value in the direction of the traveling of tape is preferably in a range of from 5 to 50 $kg/mm^2$ and the F-5 value in the direction of the width of tape is preferably in a range of from 3 to 30 kg/mm². Although it is generally true that the F-5 value in the direction of the length of tape is higher than the F-5 value in the direction of the width of tape, the general rule can be changed in the case where strength in the direction of the width perpendicularly needs to be increased.

The thermal shrinkage percentage of the non-magnetic support in the direction of the traveling of tape and in the direction of the width of tape at 100° C. for 30 minutes is preferably not larger than 3%, more preferably not larger than 1.5%. The thermal shrinkage percentage at 80° C. for 30 minutes is preferably not larger than 1%, more preferably not larger than 0.5%. It is preferable that the shear strength and elastic modulus thereof are respectively in a range of from 5 to 100 kg/mm² and in a range of from 100 to 2000 kg/mm² in the two directions.

The process for producing magnetic paint for the magnetic recording medium according to the present invention includes a kneading process, a dispersing process, and a mixing process provided before and after these processes as occasion demands. Each of the processes may be separated into two or more steps. The raw materials, such as ferromagnetic powder, binder, carbon. black, abrasive agent, antistatic agent, lubricant, solvent, and so on, used according to the present invention may be added at the beginning of any one of the processes or in the middle thereof. Each of the raw materials may be separated into groups to be added separately in two or more processes. For example, polyurethane may be separated into groups to be added separately in the kneading process, the dispersing process and the mixing process for adjusting viscosity after dispersion.

To achieve the object of the present invention, it is a matter of course that a known producing technique can be used as a part of the process, but high Br of the magnetic recording medium according to the present invention can be obtained by using a kneader, such as a continuous kneader and a pressure kneader, in the kneading process. In the case where the continuous kneader or pressure kneader is used, ferromagnetic powder and all or part (preferably, 30% or more with respect to the whole binder) of the binder are kneaded in a range of from 15 parts to 500 parts per 100 parts of ferromagnetic powder. The details of the kneading processes have been described in Japanese Patent Application Nos. Sho-62-264722 and Sho-62-236872.

Furthermore, a plastic roll of heat-resisting resin such as epoxy, polyimide, polyamide, polyimide-amide, and so on, may be used as the calendaring roll. Or, a metal roll may be used for the calendaring process. The treating temperature is preferably not lower than 70° C., more preferably not lower than 80° C. The linear pressure is preferably not smaller than 200 kg/cm, more preferably not smaller than 300 kg/cm. The speed thereof is in a range of from 20 m per minute to 700 m per minute.

The friction coefficient of the upper recording layer side surface and opposite surface of the magnetic recording medium according to the present invention against SUS420J is preferably not larger than 0.5, more preferably not larger than 0.3. The surface resistivity is preferably in a range of from $10^{-5}$ to $10^{-5}$ Ω/sq. The elastic modulus at expansion of the upper recording layer of 0.5% is preferably in a range of from 100 to 2000 kg/mm² both in the direction of the traveling and in the direction of the width. The shear strength is preferably in a range of from 1 to 30 kg/cm². The elastic modulus of the magnetic recording medium is preferably in a range of from 100 to 1500 kg/mm² both in the direction of the traveling and in the direction of the length. The residual expansion is preferably not larger than 0.5%. The thermal shrinkage percentage at any temperature of not higher than 100° C. is preferably not larger than 1%, more preferably not larger than 0.5%, most preferably not larger than 0.1%.

The residual solvent contained in the upper recording layer is preferably not larger than 100 mg/m², more preferably not larger than 10 mg/m². It is preferable that the residual solvent contained in the upper recording layer is smaller in quantity than the residual solvent contained in the intermediate layer.

The percentage of voids contained in each of the layers is preferably not larger than 30% by volume, more preferably not larger than 10% by volume.

The inference that these physical properties can be changed in each of the layers in the magnetic recording medium according to the present invention can be drawn easily. For example, traveling durability can be improved by increasing the elastic modulus of the upper recording layer and, at the same time, the fitting of the magnetic recording medium to the head can be improved by decreasing the elastic moduli of the lower and intermediate layers to smaller values than the elastic modulus of the upper recording layer.

Because the aforementioned problem arises in coating and orientation when a magnetic recording medium to provide saturation magnetic flux of from 0.01 to 0.30 Maxwell is formed alone, it is necessary to form the lower layer, the intermediate layer and the upper layer sequentially or simultaneously in the condition where the respective layers are wet. To form such three layers with uniform thickness without any defect, various types of coaters may be considered. For example, extrusion coaters as discussed in the following paragraphs (1) to (4) can be used.

(1) Three monolayer support pressure type extrusion coaters as disclosed in Japanese Patent Post-examination Publication Nos. Sho-1-34663 and Sho-1-46186 and Japanese Patent Unexamined Publication Nos. Sho-58-109162, Sho-60-238179, Hei-2-265672 and Sho-63-20069, and so on, are arranged in parallel so that three layers are applied in the condition where the respective layers are wet.

(2) Any two of the three layers are formed by using a simultaneously two-layer coat support pressure type extrusion coater as disclosed in Japanese Patent Unexamined Publication Nos. Sho-58-109162, Sho-63-88080, Hei-2-17971 and Hei-2-265672, and so on, and, on the other hand, the residual one layer is applied by a monolayer support pressure type extrusion coater as described in the paragraph (1).

(3) Three pockets and slits are formed in a known support pressure type extrusion coater as shogun in the paragraph (1), so that three layers are applied simultaneously.

(4) After the lower layer is first applied by gravure coating, roll coating or blade coating as generally used in coating a flexible support or by a backup roll-including extrusion coater or the like, the intermediate and upper layers are applied by two known monolayer support pressure type extrusion coaters as discussed in paragraph (1) or by a known coater as discussed in the paragraph (2).

To prevent the cohesion of magnetic particles 25, it is preferable that shearing be given to the coating compositions within the coater by a method as disclosed in Japanese Patent Unexamined Publication Nos. Sho-62-95174 and Hei-2-236968.

Although a technique in which at least one permanent magnet or electromagnet is disposed on a side of the support opposite to the coating surface side to make the support pass through an oblique or perpendicular magnetic field or a technique in which heteropolar opposition permanent magnets or electromagnets are disposed on both sides of the support to make the support pass through an oblique or perpendicular magnetic field can be used as the method of orientation and magnetic field attraction, the method is not limited to these techniques. As another technique, the support may be made to pass through the magnetic field after the coating layers are partially dried so as not to be completely solidified.

A reaction type resin such as an electron beam-setting resin or an ultraviolet-setting resin may be used in at least one layer of the lower, intermediate and upper layers so that the coating layer can be hardened by electron beam radiation, ultraviolet beam radiation or the like. The aforementioned orientation and magnetic field attraction may be performed when the electron beam, ultraviolet beam or the like is radiated.

To improve electromagnetic conversion characteristics, the quantity of the magnetic substance as a filler needs to be increased as much as possible. Therefore, it is necessary that film be formed in the condition where the quantities of additives such as resin, carbon, abrasives, and so on, contained in the magnetic substance dispersed composition are minimized. In this case, the electromagnetic conversion characteristics are improved but rust prevention characteristics and traveling characteristics may be lowered so that a problem similar to that in the vapor deposition type magnetic recording medium may arise. Forming protecting thin film of carbon or the like by chemical vapor deposition (CVD), plasma CVD or the like and forming lubricating film by application of a lubricating composition is an effective means to solve this problem. The vapor deposition type magnetic layer is mainly constituted by metal whereas the coating type magnetic layer contains a minimal amount of resin to thereby make the effects of the protecting thin film and lubricating film more remarkable.

As described above, according to the present invention, the three layers consisting of a lower layer mainly containing inorganic powder and resin, an intermediate layer mainly containing resin and an upper layer containing needle-shaped or granular ferromagnetic powder (magnetic powder) are formed on a non-magnetic support. Hence, not only the lower layer can be provided as a dummy layer so that the upper layer and the intermediate layer can be thinned sufficiently, but the inorganic powder in the lower layer can operate to control the surface characteristics of the upper layer, improve mechanical strength such as stiffness of the magnetic recording medium, and so on, control electrical conductivity and improve the ability to perform simultaneous multilayer coating. Furthermore, after the intermediate layer and the upper layer are formed by coating in the condition where the respective layers are wet, orientation processing is performed so that at least one part of ferromagnetic powder contained in the upper layer is disposed in the intermediate layer in the condition where the respective layers are not yet hardened. Accordingly, the magnetic particles can be fixed in the direction of orientation while the intermediate layer holds the lower end portion of the magnetic particles, so that the effect of orientation can be fulfilled.

According to the present invention, therefore, not only the magnetic layer can be reduced in thickness but the magnetic particles can be oriented effectively. Furthermore, the magnetic layer can be solidified while the proper orientation state is maintained. Consequently, a magnetic recording medium in which aptitude for high-density recording/reproduction of digital signals or the like can be improved to make improvement of high frequency output and long-term recording possible, and a method for producing the same, can be provided.

Effects of the present invention will become clearer from the following specific examples of the present invention.

The following Tables 1 through 5 show the compositions of non-magnetic coating compositions and magnetic coating compositions.

Each of the coating compositions respectively having the following components was put into a ball mill and mixedly dispersed for 10.5 hours, thus to prepare coating compositions A, B, C, D and E.

TABLE 1

| Coating composition A (components) | |
|---|---|
| Fe/Zn/Ni (weight proportion 92:4:4) powder (needle particles having a mean particle size of 0.20 μm in a lengthwise direction, major axis/minor axis ratio = 10, coercing force 1600 oersted) | 300 parts |
| Vinyl chloride-vinyl acetate copolymer (copolymerization ratio 87:13, polymerization degree 400) | 30 parts |
| Electrically conductive carbon (mean particle size 0.05 μm) | 20 parts |
| Polyamide resin (amine value 300) | 15 parts |
| Lecitin | 6 parts |
| Silicone oil (dimethyl polysiloxane) | 3 parts |
| Cyclohexane | 300 parts |
| Methyl ethyl Ketone | 300 parts |
| n-Butanol | 100 parts |

The measured viscosity of the coating composition A exhibited 0.9 poises at the shear rate of $5 \times 10^2$ sec$^{-1}$.

TABLE 2

| Coating composition B (components) | |
|---|---|
| Fe/Zn/Ni (weight proportion 92:4:4) powder (needle particles having a mean particle size of 0.10 μm in a lengthwise direction, major axis/minor axis ratio = 6, coercing force 1600 oersted) | 300 parts |
| Vinyl chloride-vinyl acetate copolymer (copolymerization ratio 87:13, polymerization degree 400) | 30 parts |
| Electrically conductive carbon (mean particle size 0.05 μm) | 20 parts |
| Polyamide resin (amine value 300) | 15 parts |
| Lecitin | 6 parts |
| Silicone oil (dimethyl polysiloxane) | 3 parts |
| Cyclohexane | 300 parts |
| Methyl ethyl Ketone | 300 parts |
| n-Butanol | 100 parts |

The measured viscosity of the coating composition B exhibited 1.7 poises at the shear rate of $5 \times 10^2$ sec$^{-1}$.

TABLE 3

| Coating composition C (components) | |
|---|---|
| Vinyl chloride-vinyl acetate copolymer (copolymerization ratio 87:13, polymerization degree 800) | 300 parts |
| Electrically conductive carbon (mean particle size 0.05 μm) | 20 parts |
| Cyclohexane | 100 parts |
| Methyl ethyl Ketone | 50 parts |
| n-Butanol | 50 parts |

The measured viscosity of the coating composition C exhibited 2.2 poises at the shear rate of $5 \times 10^2$ sec$^{-1}$.

TABLE 4

Coating composition D (components)

| | |
|---|---|
| Vinyl chloride-vinyl acetate copolymer (copolymerization ratio 87:13, polymerization degree 800) | 300 parts |
| Polyester polyurethane (molecular weight 50000) | 100 parts |
| Electrically conductive carbon (mean particle size 0.05 μm) | 20 parts |
| Cyclohexane | 100 parts |
| Methyl ethyl Ketone | 50 parts |
| n-Butanol | 50 parts |

The measured viscosity of the coating composition D exhibited 3.4 poises at the shear rate of $5 \times 10^2$ sec$^{-1}$.

TABLE 5

Coating composition E (components)

| | |
|---|---|
| TiO$_2$ powder (mean primary particle size 0.20 μm, S$_{BET}$ value: 18m$^2$/g) | 300 parts |
| Vinyl chloride-vinyl acetate copolymer (copolymerization ratio 87:13, polymerization degree 400) | 30 parts |
| Electrically conductive carbon (mean particle size 0.05 μm) | 20 parts |
| Polyamide resin (amine value 300) | 15 parts |
| Lecitin | 6 parts |
| Silicone oil (dimethyl polysiloxane) | 3 parts |
| Cyclohexane | 500 parts |
| n-Butanol | 100 parts |

The measured viscosity of the coating composition E exhibited 0.8 poises at the shear rate of $5 \times 10^2$ sec$^{-1}$.

EXAMPLE 1

Successively selecting the four combinations of A/C/E, A/D/E, B/C/E and B/D/E as the structure of upper layer/ intermediate layer/lower layer constituted by three of the coating compositions A to E, three layers were formed by a three-layer simultaneous coating type support pressure extrusion coater. Then, orientation, drying and calendaring were performed to prepare evaluation samples. The detailed condition of production of the evaluation samples was as follows.

Conditions of Support

Material: polyethylene terephthalate film

Thickness: 8 μm

Width: 300 mm

Tension: 15 kgw/m

Traveling (coating) speed: 200 m/min

With respect to the coater and coating method used, various kinds of samples were produced by a three-layer simultaneous coating type support pressure extrusion coater having the form shown in FIG. 1 while flux is changed by changing thickness after drying and calendaring. The direction of the flux was measured by using a vibration sample type magnetometer VSM made by Toei Kogyo Co., Ltd.

With respect to the film thicknesses, evaluation samples were produced so that the dry thickness of the lower layer and the dry thickness of the intermediate layer were respectively set to 2.0 μm and 0.3 μm but the dry thickness of the upper layer was changed.

With respect to the thicknesses of the layers, a large number of samples were separately produced as shown in Table 14. It was apparent therefrom that good coating results could be achieved in the case where the dry thicknesses of the upper layer, the intermediate layer and the lower layer were in a range of from 0.05 to 0.7 μm, in a range of from 0.1 to 0.8 μm and in a range of from 0.5 to 3.5 μm as shown in Table 14.

With respect to the orientation apparatus and method, as shown in FIG. 3, a pair of samarium-cobalt heteropolar opposition permanent magnets having 3608 gausses were provided in a dryer so as to be disposed respectively at a distance of 10 mm from the rear surface of the support and at a distance of 15 mm from the front surface thereof. The direction of main magnetic field with respect to the support surface was changed to thereby produce samples of 0°, 10°, 30°, 60° and 90° as the direction of main orientation. The direction of main orientation was obtained by measuring the degree of orientation at intervals of an angle of 5° with the magnetic field intensity of 5 kilo-oersted (kOe) by using a vibration sample type magnetometer VSM made by Toei Kogyo Co., Ltd.

In the various kinds of samples produced by the aforementioned apparatus and method, reproduction outputs in the case where a single wave of 7 MHz was recorded by using an 8 mm video tape recorder (FUJIX-8 made by Fuji Photo Film Co., Ltd.) put on the market were shown in Tables 6 through 9. The value of each of the reproduction outputs shown in Tables 6 through 9 corresponds to a value when a reproduction output from FUJI SUPER HG P6-120 made by Fuji Photo Film C6., Ltd. among 8 mm video tapes on the market is regarded as 0 dB. As shown in Tables 6 through 9, samples according to the present invention exhibit higher outputs in a range of saturation flux of from 0.01 to 0.30 (Maxwell) and in a range of orientation angle θ of from 10° to 90° than the output of a reference sample shown in Table 13.

In the comparative example shown in Table 13, the same condition as the aforementioned embodiment was applied except that the orientation angle was 30° and A/E was used as the upper layer/lower layer with coating of no intermediate layer.

TABLE 6

Table 6 Reproduction Output of A/C/E
Upper/Intermediate/Lower A/C/E

| Direction of main orientation (°) | Magnetic flux (Mx) | Reproduction output (dB) |
|---|---|---|
| 0 | 0.005 | −4.7 |
|   | 0.010 | −2.1 |
|   | 0.050 | 2.4 |
|   | 0.100 | 1.9 |
|   | 0.200 | 0.8 |
|   | 0.300 | 0 |
|   | 0.400 | −3.9 |
| 10 | 0.005 | −1.4 |
|   | 0.010 | 0.1 |
|   | 0.050 | 3.9 |
|   | 0.100 | 3.7 |
|   | 0.200 | 2.1 |
|   | 0.300 | 0.3 |
|   | 0.400 | −2.2 |
| 30 | 0.005 | −0.7 |
|   | 0.010 | 1.0 |
|   | 0.050 | 6.5 |
|   | 0.100 | 6.2 |
|   | 0.200 | 5.1 |
|   | 0.300 | 1.9 |
|   | 0.400 | −2.1 |
| 60 | 0.005 | −0.5 |
|   | 0.010 | 0.9 |
|   | 0.050 | 5.8 |
|   | 0.100 | 5.7 |

TABLE 6-continued

Table 6 Reproduction Output of A/C/E
Upper/Intermediate/Lower A/C/E

| Direction of main orientation (°) | Magnetic flux (Mx) | Reproduction output (dB) |
| --- | --- | --- |
|  | 0.200 | 4.0 |
|  | 0.300 | 1.1 |
|  | 0.400 | −2.9 |
| 90 | 0.005 | −0.8 |
|  | 0.010 | 0.5 |
|  | 0.050 | 4.8 |
|  | 0.100 | 4.4 |
|  | 0.200 | 3.1 |
|  | 0.300 | 0.4 |
|  | 0.400 | −3.9 |

TABLE 7

Table 7 Reproduction Output of A/D/E
Upper/Intermediate/Lower A/D/E

| Direction of main orientation (°) | Magnetic flux (Mx) | Reproduction output (dB) |
| --- | --- | --- |
| 0 | 0.005 | −4.5 |
|  | 0.010 | −2.1 |
|  | 0.050 | 2.6 |
|  | 0.100 | 2.1 |
|  | 0.200 | 0.9 |
|  | 0.300 | 0.2 |
|  | 0.400 | −3.2 |
| 10 | 0.005 | −1.3 |
|  | 0.010 | 0.2 |
|  | 0.050 | 4.1 |
|  | 0.100 | 3.8 |
|  | 0.200 | 2.4 |
|  | 0.300 | 0.8 |
|  | 0.400 | −1.9 |
| 30 | 0.005 | −0.4 |
|  | 0.010 | 1.3 |
|  | 0.050 | 7.0 |
|  | 0.100 | 6.7 |
|  | 0.200 | 5.4 |
|  | 0.300 | 2.1 |
|  | 0.400 | −1.7 |
| 60 | 0.005 | −0.4 |
|  | 0.010 | 0.9 |
|  | 0.050 | 6.0 |
|  | 0.100 | 5.9 |
|  | 0.200 | 4.4 |
|  | 0.300 | 1.3 |
|  | 0.400 | −2.5 |
| 90 | 0.005 | −0.5 |
|  | 0.010 | 0.5 |
|  | 0.050 | 5.1 |
|  | 0.100 | 4.8 |
|  | 0.200 | 3.4 |
|  | 0.300 | 0.6 |
|  | 0.400 | −3.4 |

TABLE 8

Table 8 Reproduction Output of B/C/E
Upper/Intermediate/Lower B/C/E

| Direction of main orientation (°) | Magnetic flux (Mx) | Reproduction output (dB) |
| --- | --- | --- |
| 0 | 0.005 | −3.5 |
|  | 0.010 | −1.2 |
|  | 0.050 | 3.6 |
|  | 0.100 | 3.2 |
|  | 0.200 | 1.8 |
|  | 0.300 | 1.1 |
|  | 0.400 | −2.0 |
| 10 | 0.005 | −0.9 |
|  | 0.010 | 0.6 |
|  | 0.050 | 5.1 |
|  | 0.100 | 5.0 |
|  | 0.200 | 3.5 |
|  | 0.300 | 1.9 |
|  | 0.400 | −0.9 |
| 30 | 0.005 | −0.1 |
|  | 0.010 | 2.3 |
|  | 0.050 | 8.4 |
|  | 0.100 | 7.6 |
|  | 0.200 | 6.4 |
|  | 0.300 | 2.9 |
|  | 0.400 | −0.5 |
| 60 | 0.005 | −0.2 |
|  | 0.010 | 1.9 |
|  | 0.050 | 7.4 |
|  | 0.100 | 6.8 |
|  | 0.200 | 5.6 |
|  | 0.300 | 2.4 |
|  | 0.400 | −1.5 |
| 90 | 0.005 | −0.3 |
|  | 0.010 | 1.1 |
|  | 0.050 | 5.9 |
|  | 0.100 | 5.1 |
|  | 0.200 | 4.4 |
|  | 0.300 | 1.3 |
|  | 0.400 | −2.5 |

TABLE 9

Table 9 Reproduction Output of B/D/E
Upper/Intermediate/Lower B/D/E

| Direction of main orientation (°) | Magnetic flux (Mx) | Reproduction output (dB) |
| --- | --- | --- |
| 0 | 0.005 | −3.7 |
|  | 0.010 | −1.2 |
|  | 0.050 | 3.7 |
|  | 0.100 | 3.4 |
|  | 0.200 | 2.0 |
|  | 0.300 | 1.1 |
|  | 0.400 | −2.2 |
| 10 | 0.005 | −1.0 |
|  | 0.010 | 0.4 |
|  | 0.050 | 5.0 |
|  | 0.100 | 4.8 |
|  | 0.200 | 3.2 |
|  | 0.300 | 1.7 |
|  | 0.400 | −1.2 |
| 30 | 0.005 | −0.2 |
|  | 0.010 | 2.4 |
|  | 0.050 | 8.6 |
|  | 0.100 | 7.6 |
|  | 0.200 | 6.6 |
|  | 0.300 | 3.1 |
|  | 0.400 | −0.4 |
| 60 | 0.005 | −0.1 |
|  | 0.010 | 2.0 |
|  | 0.050 | 7.5 |
|  | 0.100 | 6.8 |
|  | 0.200 | 5.7 |
|  | 0.300 | 2.5 |
|  | 0.400 | −1.4 |
| 90 | 0.005 | −0.2 |

TABLE 9-continued

Table 9 Reproduction Output of B/D/E
Upper/Intermediate/Lower B/D/E

| Direction of main orientation (°) | Magnetic flux (Mx) | Reproduction output (dB) |
|---|---|---|
|  | 0.010 | 1.2 |
|  | 0.050 | 6.1 |
|  | 0.100 | 5.4 |
|  | 0.200 | 4.5 |
|  | 0.300 | 1.4 |
|  | 0.400 | −2.1 |

EXAMPLE 2

An example in which three layers were formed by a coater which is different from that of Example 1 so that the structure of the upper layer/intermediate layer/lower layer is constituted by the coating compositions A/C/E is described as follows.

The same support condition, the same orientation apparatus and method and the same coating thickness as in Example 1 were applied to this embodiment.

The coating apparatus and method were carried out with respect to the following three cases. (1) Three support pressure extrusion coaters as shown in Japanese Patent Unexamined Publication No. Sho-60-238179 were arranged in parallel, so that coatings were performed in a wet state for the lower layer, the intermediate layer and the upper layer respectively. (2) After the respective coatings for the lower layer and the intermediate layer were performed simultaneously by using a support pressure extrusion coater as shown in Japanese Patent Unexamined Publication No. Sho-63-88080, the upper layer kept in a wet state was applied by using a support pressure extrusion coater as disclosed in Japanese Patent Unexamined Publication No. Sho-60-238179. (3) A silt for upper layer was added to a backup roll-including extrusion coater having a doctoring function as disclosed in Japanese Patent Unexamined Publication No. Hei-2-174965, so that the respective coatings for the lower layer, the intermediate layer and the upper layer were performed simultaneously.

Results of measurement of reproduction outputs in various kinds of samples produced in the same manner as Example 1 by using the coating apparatus and methods as shown in the above paragraphs (1) to (3) are shown in Tables 10 through 12.

As shown in Tables 10 through 12, a high reproduction output substantially equal to that in Example 1 could be obtained in each of the coating apparatus and methods in a range of orientation angle θ of from 10° to 90°, compared with Table 13.

TABLE 10

Table 10 Reproduction Output in Embodiment 2-1

| Coating apparatus and method | Direction of main orientation (°) | Magnetic flux (Mx) | Reproduction output (dB) |
|---|---|---|---|
| According to the coating apparatus and method in Embodiment 2-1 | 0 | 0.005 | −4.7 |
|  |  | 0.010 | −2.2 |
|  |  | 0.050 | 2.4 |
|  |  | 0.100 | 1.9 |
|  |  | 0.200 | 0.9 |
|  |  | 0.300 | 0.1 |
|  |  | 0.400 | −3.9 |
|  | 10 | 0.005 | −1.4 |
|  |  | 0.010 | 0.2 |
|  |  | 0.050 | 3.9 |
|  |  | 0.100 | 3.8 |
|  |  | 0.200 | 2.0 |
|  |  | 0.300 | 0.4 |
|  |  | 0.400 | −2.1 |
|  | 30 | 0.005 | −0.7 |
|  |  | 0.010 | 1.1 |
|  |  | 0.050 | 6.6 |
|  |  | 0.100 | 6.3 |
|  |  | 0.200 | 5.0 |
|  |  | 0.300 | 1.8 |
|  |  | 0.400 | −2.0 |
|  | 60 | 0.005 | −0.5 |
|  |  | 0.010 | 0.9 |
|  |  | 0.050 | 5.9 |
|  |  | 0.100 | 5.7 |
|  |  | 0.200 | 3.9 |
|  |  | 0.300 | 1.1 |
|  |  | 0.400 | −2.8 |
|  | 90 | 0.005 | −0.7 |
|  |  | 0.010 | 0.7 |
|  |  | 0.050 | 4.8 |
|  |  | 0.100 | 4.4 |
|  |  | 0.200 | 3.0 |
|  |  | 0.300 | 0.4 |
|  |  | 0.400 | −4.0 |

TABLE 11

Table 11 Reproduction Output in Embodiment 2-2

| Coating apparatus and method | Direction of main orientation (°) | Magnetic flux (Mx) | Reproduction output (dB) |
|---|---|---|---|
| According to the coating apparatus and method in Embodiment 2-2 | 0 | 0.005 | −4.7 |
|  |  | 0.010 | −2.3 |
|  |  | 0.050 | 2.3 |
|  |  | 0.100 | 2.0 |
|  |  | 0.200 | 0.8 |
|  |  | 0.300 | 0.1 |
|  |  | 0.400 | −3.7 |
|  | 10 | 0.005 | −1.6 |
|  |  | 0.010 | 0.4 |
|  |  | 0.050 | 4.0 |
|  |  | 0.100 | 3.6 |
|  |  | 0.200 | 2.0 |
|  |  | 0.300 | 0.4 |
|  |  | 0.400 | −2.3 |
|  | 30 | 0.005 | −0.8 |
|  |  | 0.010 | 1.1 |
|  |  | 0.050 | 6.5 |
|  |  | 0.100 | 6.3 |
|  |  | 0.200 | 5.2 |
|  |  | 0.300 | 1.9 |
|  |  | 0.400 | −1.9 |
|  | 60 | 0.005 | −0.5 |
|  |  | 0.010 | 1.1 |
|  |  | 0.050 | 6.0 |
|  |  | 0.100 | 5.7 |
|  |  | 0.200 | 4.1 |
|  |  | 0.300 | 1.1 |
|  |  | 0.400 | −2.9 |
|  | 90 | 0.005 | −0.7 |
|  |  | 0.010 | 0.8 |
|  |  | 0.050 | 4.7 |

TABLE 11-continued

Table 11 Reproduction Output in Embodiment 2-2

| Coating apparatus and method | Direction of main orientation (°) | Magnetic flux (Mx) | Reproduction output (dB) |
|---|---|---|---|
| | | 0.100 | 4.2 |
| | | 0.200 | 2.9 |
| | | 0.300 | 0.3 |
| | | 0.400 | -3.9 |

TABLE 12

Table 12 Reproduction Output in Embodiment 2-3

| Coating apparatus and method | Direction of main orientation (°) | Magnetic flux (Mx) | Reproduction output (dB) |
|---|---|---|---|
| According to the coating apparatus and method in Embodiment 2-3 | 0 | 0.005 | -4.8 |
| | | 0.010 | -2.2 |
| | | 0.050 | 2.3 |
| | | 0.100 | 1.8 |
| | | 0.200 | 0.9 |
| | | 0.300 | 0.1 |
| | | 0.400 | -3.8 |
| | 10 | 0.005 | -1.8 |
| | | 0.010 | 0.2 |
| | | 0.050 | 3.8 |
| | | 0.100 | 3.7 |
| | | 0.200 | 1.9 |
| | | 0.300 | 0.3 |
| | | 0.400 | -2.4 |
| | 30 | 0.005 | -0.8 |
| | | 0.010 | 1.3 |
| | | 0.050 | 6.7 |
| | | 0.100 | 6.5 |
| | | 0.200 | 5.0 |
| | | 0.300 | 1.9 |
| | | 0.400 | -1.9 |
| | 60 | 0.005 | -0.4 |
| | | 0.010 | 0.9 |
| | | 0.050 | 5.9 |
| | | 0.100 | 5.8 |
| | | 0.200 | 4.0 |
| | | 0.300 | 1.3 |
| | | 0.400 | -2.7 |
| | 90 | 0.005 | -0.7 |
| | | 0.010 | 0.6 |
| | | 0.050 | 4.7 |
| | | 0.100 | 4.3 |
| | | 0.200 | 3.0 |
| | | 0.300 | 0.2 |
| | | 0.400 | -3.9 |

TABLE 13

Table 13 Reproduction Output of A/E

| Upper/Lower A/E | Direction of main orientation (°) | Magnetic flux (Mx) | Reproduction output (dB) |
|---|---|---|---|
| | 30 | 0.005 | -7.7 |
| | | 0.010 | -4.9 |
| | | 0.050 | -2.0 |
| | | 0.100 | 1.0 |
| | | 0.200 | 0.8 |
| | | 0.300 | -2.9 |
| | | 0.400 | -5.1 |

TABLE 14

Table 14 (Direction of Main Orientation ... 30° C.)

| Thickness of Upper Layer (μm) | Thickness of Intermediate Layer (μm) | Thickness of Lower Layer (μm) | Evaluation of Coating Performance | Reproduction output (dB) |
|---|---|---|---|---|
| 0.3 | 0.05 | 2.0 | x | -0.4 |
| | 0.10 | | o | 3.4 |
| | 0.30 | | o | 0.2 |
| | 0.50 | | o | 7.5 |
| | 0.80 | | o | 7.9 |
| | 0.85 | | o | 7.9 |
| 0.03 | 0.3 | 2.0 | Δ | -4.1 |
| 0.05 | | | o | 0.4 |
| 0.10 | | | o | 5.8 |
| 0.50 | | | o | 5.6 |
| 0.70 | | | o | 2.9 |
| 0.75 | | | o | -0.2 |
| 0.3 | 0.3 | 0.30 | o | -2.0 |
| | | 0.50 | o | 1.0 |
| | | 1.00 | o | 3.9 |
| | | 2.00 | o | 6.2 |
| | | 3.00 | o | 7.8 |
| | | 3.50 | o | 7.9 |
| | | 4.00 | o | 8.0 |

A method for producing a magnetic recording medium according to another embodiment of the present invention will be described below with reference to FIGS. 6 and 8–11.

Figure 6:
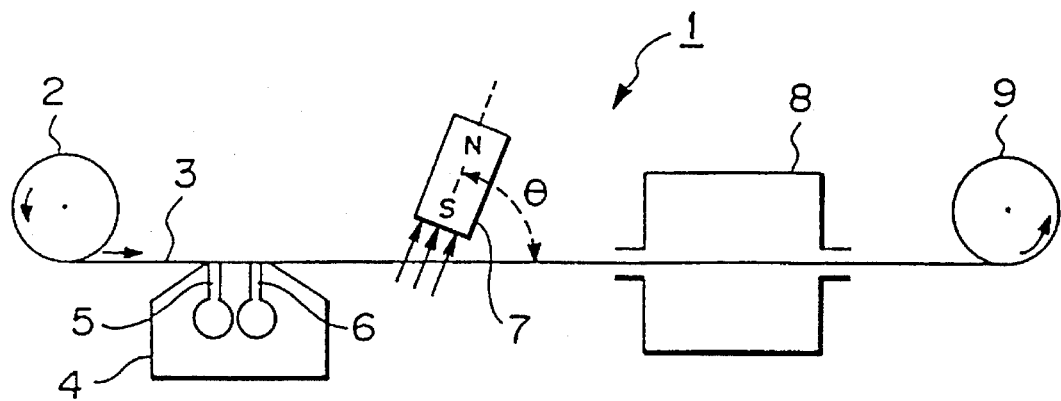
FIG. 6 is a schematic view of a magnetic recording medium producing process according to another embodiment of the present invention.

A magnetic recording medium producing apparatus 1 shown in FIG. 6 performs a series of producing steps beginning with a step of feeding a support 3 out of a delivery roll 2 and terminating with a step of rewinding the support on a take-up roll 9.

First, the support 3 unwound from the delivery roll 2 is multiply coated with predetermined coating compositions by a multilayer coater 4. The coating compositions include an undercoating composition which is a non-magnetic coating composition discharged from a forward slit 5 and an overcoating composition which is a magnetic coating composition discharged from a rearward slit 6. The coating step is followed by a step of orienting the particles in a predetermined direction by application of a magnetic field generated by a magnet 7. The magnet 7 is disposed on the rear side of the support 3, that is, on a side opposite the coating surface thereof, and applies a magnetic field at a specific angle (θ) to the coating surface to orient the magnetic particles in the magnetic coating while attracting the magnetic particles toward the non-magnetic coating side of the support.

After the orientation step, the resulting medium is suitably dried by a dryer 8 and subjected to additional steps such as a calendaring step (not shown) before it is rewound on the take-up roll 9.

Although the apparatus shown in FIG. 6 has a structure in which a magnet 7 is disposed on the rear side of the support 3, it is to be understood that the invention is not limited to the specific embodiment and that the invention can be applied to the case where the apparatus may have a conventional structure in which magnets are respectively disposed on opposite sides of the support as long as the magnet on the side (rear side) opposite the coating side of the support 3 applies a more intensive magnetic field to the magnetic layer than the magnet on the opposite, coating side of the support (i.e., as long the magnetic particles are attracted toward the support).

According to the invention, the non-magnetic undercoat layer has a viscosity which is larger than that of the magnetic overcoat layer in the case where magnetic particles are excluded.

In this embodiment, magnetic particles in the magnetic layer are oriented such that they are aligned in a predetermined direction while simultaneously being attracted toward the support (i.e., toward the non-magnetic layer) by applying a magnetic field at a specific angle to the coating surface in the condition that the two layers formed from the magnetic coating composition and the non-magnetic coating composition are not yet hardened after application of the coating compositions. The simultaneous rotational orientation and translational movement of the magnetic particles makes it easier to arrange the particles to thereby improve efficiency in orientation, compared with the conventional method where the particles are merely rotated to the desired orientation using a magnetic field.

The magnetic particles attracted toward the non-magnetic layer side are maintained by the viscous force of the non-magnetic layer having a viscosity larger than that of the magnetic layer, in the case where the magnetic particles are excluded, so that the non-magnetic layer is implanted with the magnetic particles. The non-magnetic layer can support the magnetic particles with a strong holding force to prevent movement of the magnetic particles that might otherwise be caused by factors, such as vibration, external force or the like, after the orientation step and before the drying step.

Furthermore, the composition obtained by excluding magnetic particles from the magnetic layer can be made low in viscosity, so that a very thin, low-viscosity layer absent any magnetic particles is formed in the magnetic layer at the surface side of the magnetic layer as a result of the movement of the magnetic particles toward the support during the orientation step. Accordingly, the roughness of the outer surface due to the presence of protruding magnetic particles which is present in the conventional method can be suppressed.

Any support used in a conventional coating-type magnetic recording medium may be used as the support 3 in the present invention. Furthermore, materials for magnetic power, binder, solvent, additives and so on are not limited specifically, so that available materials may be used.

In the present invention, it is however necessary that the viscosity (hereinafter called magnetic composition fundamental viscosity) of the magnetic coating composition, in the case where magnetic particles are absent from the magnetic coating composition, be considered when the composition of the magnetic coating composition is determined. With respect to the method of measurement of the magnetic composition fundamental viscosity, a composition obtained by removing magnetic particles from the magnetic coating composition may be prepared so that the viscosity can be measured by a synchronous electric rotational viscometer, trademark "VISMETRON" made by Shibaura System Co., Ltd., or the like. The magnetic composition fundamental viscosity strongly influences the results of orientation of magnetic particles. It is a matter of course that the viscosity is adjusted to an optimum value by changing the amount of binder and the layer of solvent while considering dispersibility, aptitude for coating, and the like.

The ingredients of the undercoat, non-magnetic composition are not limited specifically, but it is necessary that the viscosity thereof be higher than the magnetic composition fundamental viscosity in order to allow the magnetic particles to be implanted therein in such a manner that the particles remained fixed in the proper orientation. According to experiments by the present inventors, the viscosity of the non-magnetic composition, measured by the aforementioned viscometer, should be not lower than 10 poises, and preferably, not lower than 20 poises, in order to retain the magnetic particles. Considering the coating process, it is preferable that the viscosity not be too high at the time of coating. Hence, it is effective to disperse powder including non-magnetic fine particles into the composition to give thixotropy to the composition or to apply a low-viscosity non-magnetic composition and then increase the viscosity just before, during or after the orientation step. Examples of the viscosity heightening method are drying, ultraviolet hardening, EB hardening and the like.

After the magnetic and non-magnetic compositions are prepared, they are successively or simultaneously applied onto the support 3 to form a multilayer thereon. It is a matter of course that the multilayer coating method is not limited specifically and that any one of various known methods may be used.

After coating, the non-magnetic layer is implanted with magnetic particles from the magnetic layer side while orienting the magnetic particles in the magnetic layer at an arbitrary angle corresponding to the purpose of use before hardening the two layers perfectly. As described above, therefore, magnetic particles are displaced from the surface side of the magnetic layer, so that a smooth, continuous outer layer.

If materials, such as lubricants, abrasives and so on, are mixed in the continuous layer, the overcoat layer (obtained by hardening the continuous layer) after drying contributes to improvements in traveling performance, durability and so on. In the case where magnetic particles in the overcoat layer almost perfectly move to the undercoat layer after drying, the remaining overcoat layer may become thicker than necessary to constitute an obstacle to high-density recording. In this case, adjustment may be made by means of raking the overcoat layer or by other means.

As described above, according to the present invention, after application of a magnetic coating composition and a non-magnetic coating composition, magnetic particles in the magnetic layer are attracted toward the non-magnetic layer so as to be disposed in the direction of the length thereof while the two layers are not yet hardened. Hence, the orientation of the magnetic particles with movement makes it possible to improve efficiency in orientation compared with the case where the particles are oriented while being rotated by a magnetic field at the position where the magnetic field is applied. At the same time, the magnetic particles attracted toward the non-magnetic layer are maintained by viscous force of the non-magnetic layer having a larger viscosity, so that the magnetic particles can be supported by strong holding power opposable to factors, such as vibration, external force and so on, disordering the orientation in the after-process up to the drying process after the orienting process. Furthermore, according to this coating method, the viscosity of the composition obtained by removing magnetic particles from the magnetic layer can be made low, so that a very thin low-viscosity layer not including magnetic particles is formed at the surface side of the magnetic layer as a result of movement of magnetic particles of the magnetic layers toward the support by orientation. Accordingly, the roughness of the surface caused by magnetic particles can be suppressed, so that the surface performance of the magnetic layer can be improved.

Thus, the present invention can provide a method for producing a magnetic recording medium having high-density recording capability by which not only orientation of magnetic particles can be performed effectively but solidification of the magnetic layer can be performed while the orientation is maintained.

Effects of the present invention will become clearer from the following specific examples of the present invention.

The following Tables 1 through 5 show the compositions of non-magnetic coating compositions and magnetic coating compositions. Results of production through suitably multiply applying these coating compositions by the method of the present invention and the conventional method were compared. In the tables, "part" means part by weight.

TABLE 15

Undercoat non-magnetic composition A

| | |
|---|---|
| Inorganic powder $SnO_2$ | 100 parts |
| specific gravity 7.01 | |
| mean particle size 0.02 μm | |
| Carbon black | 17 parts |
| mean primary particle size 18 mμ | |
| pH 8.0 | |
| specific surface area ($S_{BET}$) | |
| 250 m²/g | |
| Vinyl chloride-vinyl acetate-vinyl | 11 parts |
| alcohol copolymer | |
| including $5 \times 10^{-6}$ eq/g of a polar | |
| group —$N(CH_3)_3{}^+Cl^-$ | |
| proportion 86:13:1, | |
| polymerization degree 400 | |
| Polyester polyurethane resin | 5 parts |
| including $1 \times 10^{-4}$ eq/g of a group | |
| —$SO_3Na$ | |
| Butyl stearate | 1 part |
| Stearic acid | 1 part |
| Methyl ethyl ketone | 150 parts |

TABLE 16

Undercoat non-magnetic composition B

| | |
|---|---|
| Inorganic powder $SnO_2$ | 100 parts |
| specific gravity 7.01 | |
| mean particle size 0.02 μm | |
| Carbon black | 20 parts |
| mean primary particle size 18 mμ | |
| pH 8.0 | |
| specific surface area ($S_{BET}$) | |
| 250 m²/g | |
| Vinyl chloride-vinyl acetate-vinyl | 13 parts |
| alcohol copolymer | |
| including $5 \times 10^{-6}$ eq/g of a polar | |
| group —$N(CH_3)_3{}^+Cl^-$ | |
| proportion 86:13:1, | |
| polymerization degree 400 | |
| Polyester polyurethane resin | 5 parts |
| including $1 \times 10^{-4}$ eq/g of a group | |
| —$SO_3Na$ | |
| Butyl stearate | 1 part |
| Stearic acid | 1 part |
| Methyl ethyl ketone | 240 parts |

TABLE 17

Undercoat non-magnetic composition C

| | |
|---|---|
| Inorganic powder $SnO_2$ | 100 parts |
| specific gravity 7.01 | |
| mean particle size 0.02 μm | |
| Carbon black | 20 parts |
| mean primary particle size 18 mμ | |
| pH 8.0 | |
| specific surface area ($S_{BET}$) | |

TABLE 17-continued

Undercoat non-magnetic composition C

| | |
|---|---|
| 250 m²/g | |
| Vinyl chloride-vinyl acetate-vinyl | 16 parts |
| alcohol copolymer | |
| including $5 \times 10^{-6}$ eq/g of a polar | |
| group —$N(CH_3)_3{}^+Cl^-$ | |
| proportion 86:13:1, | |
| polymerization degree 400 | |
| Polyester polyurethane resin | 5 parts |
| including $1 \times 10^{-4}$ eq/g of a group | |
| —$SO_3Na$ | |
| Butyl stearate | 1 part |
| Stearic acid | 1 part |
| Methyl ethyl ketone | 260 parts |

TABLE 18

Overcoat magnetic composition A

| | |
|---|---|
| Ferromagnetic metal powder | 100 parts |
| proportion Fe/Zn/Ni = 92/4/4 | |
| specific gravity 6.01 | |
| Hc 1600 Oe | |
| specific surface area ($S_{BET}$) 60 m²/g | |
| crystal size 195Å | |
| particle size (major axis diameter) 0.15 μm | |
| acicular ratio 10 | |
| Vinyl chloride copolymer | 35 parts |
| including $1 \times 10^{-4}$ eq/g of a group —$SO_3Na$ | |
| polymerization degree 300 | |
| Polyester polyurethane resin | 5 parts |
| including $1 \times 10^{-4}$ eq/g of a group —$SO_3Na$ | |
| (α-alumina (particle size 0.3 μm) | 2 parts |
| Carbon black (particle size 0.1 μm) | 0.5 parts |
| Butyl stearate | 1 part |
| Stearic acid | 2 parts |
| Methyl ethyl ketone | 200 parts |

TABLE 19

Overcoat magnetic composition B

| | |
|---|---|
| Ferromagnetic metal powder | 100 parts |
| proportion Fe/Zn/Ni = 92/4/4 | |
| specific gravity 6.01 | |
| Hc 1600 Oe | |
| specific surface area ($S_{BET}$) 60 m²/g | |
| crystal size 195Å | |
| particle size (major axis diameter) 0.15 μm | |
| acicular ratio 10 | |
| Vinyl chloride copolymer | 12 parts |
| including $1 \times 10^{-4}$ eq/g of a group —$SO_3Na$ | |
| polymerization degree 300 | |
| Polyester polyurethane resin | 5 parts |
| including $1 \times 10^{-4}$ eq/g of a group —$SO_3Na$ | |
| (α-alumina (particle size 0.3 μm) | 2 parts |
| Carbon black (particle size 0.1 μm) | 0.5 parts |
| Butyl stearate | 1 part |
| Stearic acid | 2 parts |
| Methyl ethyl ketone | 200 parts |

EXAMPLE 1

The constituent members of the undercoat non-magnetic composition A and overcoat magnetic composition α as shown above were respectively kneaded by a continuous kneader and then dispersed by using a sand mill. Polyisocyanate was introduced into the thus obtained dispersive compositions so that 6 parts of polyisocyanate and 3 parts of polyisocyanate were respectively added to the undercoat non-magnetic composition and the overcoat magnetic composition. Then, 40 parts of butyl acetate were added to each of the coating compositions. The resulting compositions were respectively filtered by using a filter having a mean pore size of 1 μm to prepare coating compositions respectively used for forming an undercoat non-magnetic layer and an overcoat magnetic layer.

At the same time, a composition obtained by removing magnetic particles from the overcoat magnetic composition α was prepared. The viscosity (magnetic composition fundamental viscosity) of the composition obtained by removing magnetic particles and the viscosity of the undercoat non-magnetic composition were measured by "VISMET-RON" made by Shibaura System Co., Ltd.

Then, as shown in FIG. 6, the thus obtained undercoat non-magnetic composition and overcoating composition were simultaneously multiply applied onto a support of polyethylene terephthalate having a thickness of 7 μm and a center line surface roughness of 0.01 μm so that an undercoat non-magnetic layer having a thickness of 2 μm after being dried was formed just before an overcoat magnetic layer having a thickness of 0.3 μm after being dried was further formed thereon. In the condition where the two layers were not yet hardened, magnetic fields produced by an orientation-purpose permanent magnet (magnet 7) set to form vertical angles θ of 90 degrees and 45 degrees and having a magnetic field intensity of 3600 gausses to provide vertical components were respectively applied thereto. Then, the resulting compositions were dried by a dryer, thus to prepare a perpendicular magnetic recording medium and a 45° oblique magnetic recording medium.

EXAMPLE 2

A perpendicular magnetic recording medium and a 45° oblique orientation magnetic recording medium were prepared in the same manner as Example 1, except that the undercoat non-magnetic composition A and the overcoat magnetic composition α were respectively replaced by an undercoat non-magnetic composition B and an overcoat magnetic composition β.

Comparative Example 1

A perpendicular magnetic recording medium and a 45° oblique orientation magnetic recording medium were prepared in the same manner as Example 1, except that the undercoat non-magnetic composition A was replaced by an undercoat non-magnetic composition B.

Comparative Example 2

A perpendicular magnetic recording medium and a 45° oblique orientation magnetic recording medium were prepared in the same manner as Example 1, except that the undercoat non-magnetic composition A and the overcoat magnetic composition α were respectively replaced by an undercoat non-magnetic composition C and an overcoat magnetic composition β.

Comparative Example 3

Figure 7:
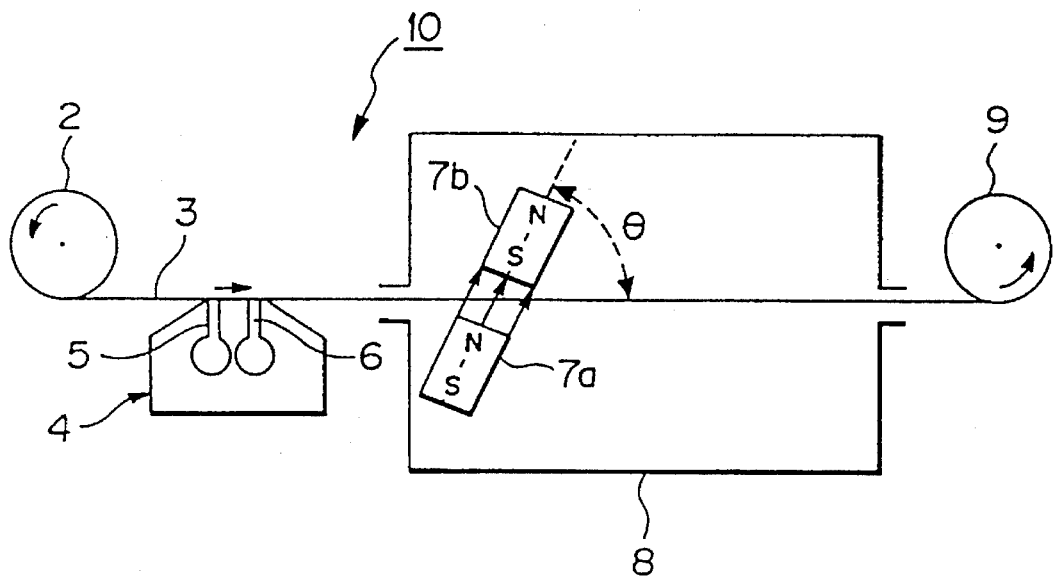
FIG. 7 is a schematic view of a producing process showing a conventional magnetic recording medium producing method.
Figure 8:
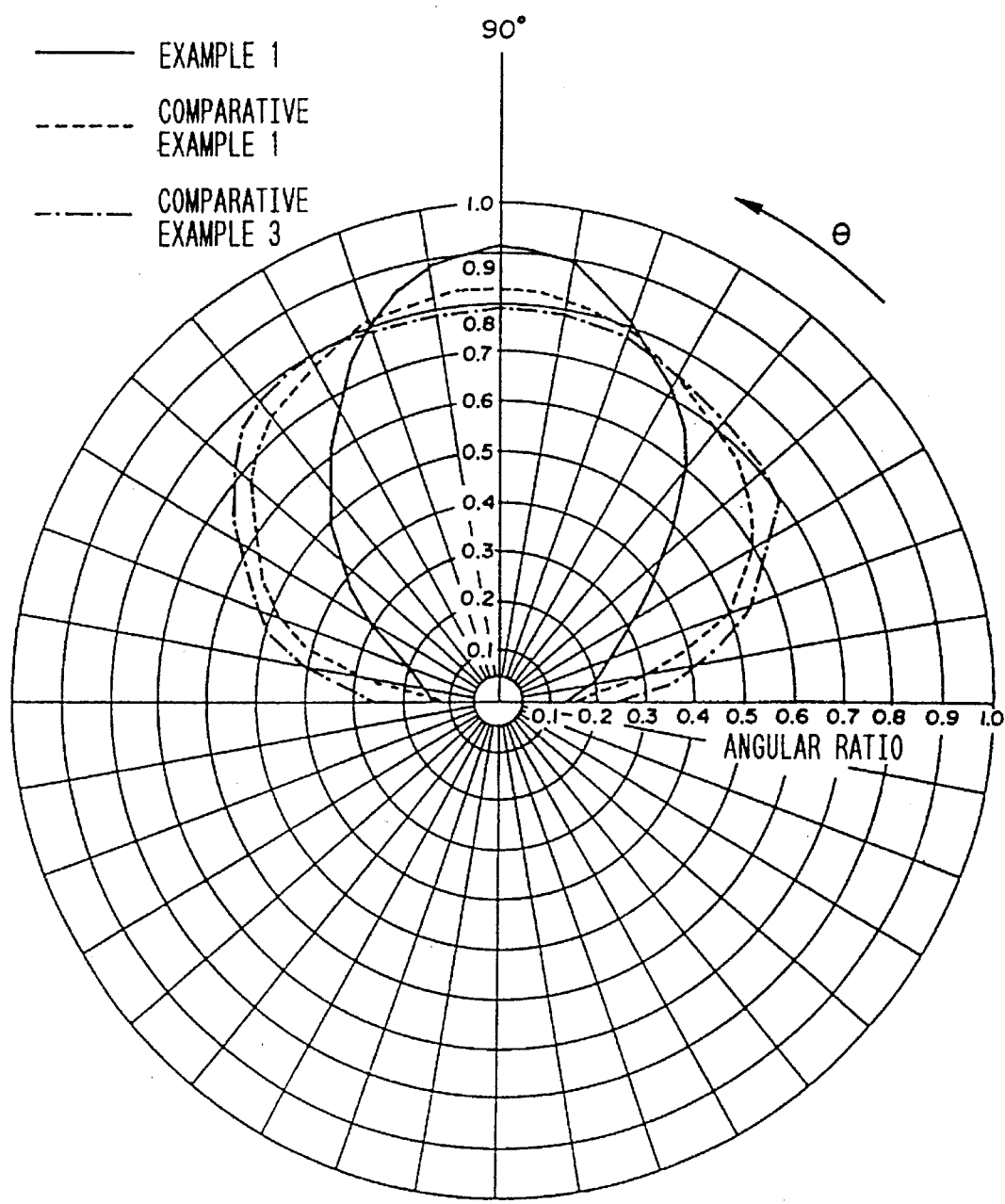
FIG. 8 is a graph showing angle distributions (in the case of magnetic composition α) of angular ratios in perpendicular magnetic recording media.
Figure 9:
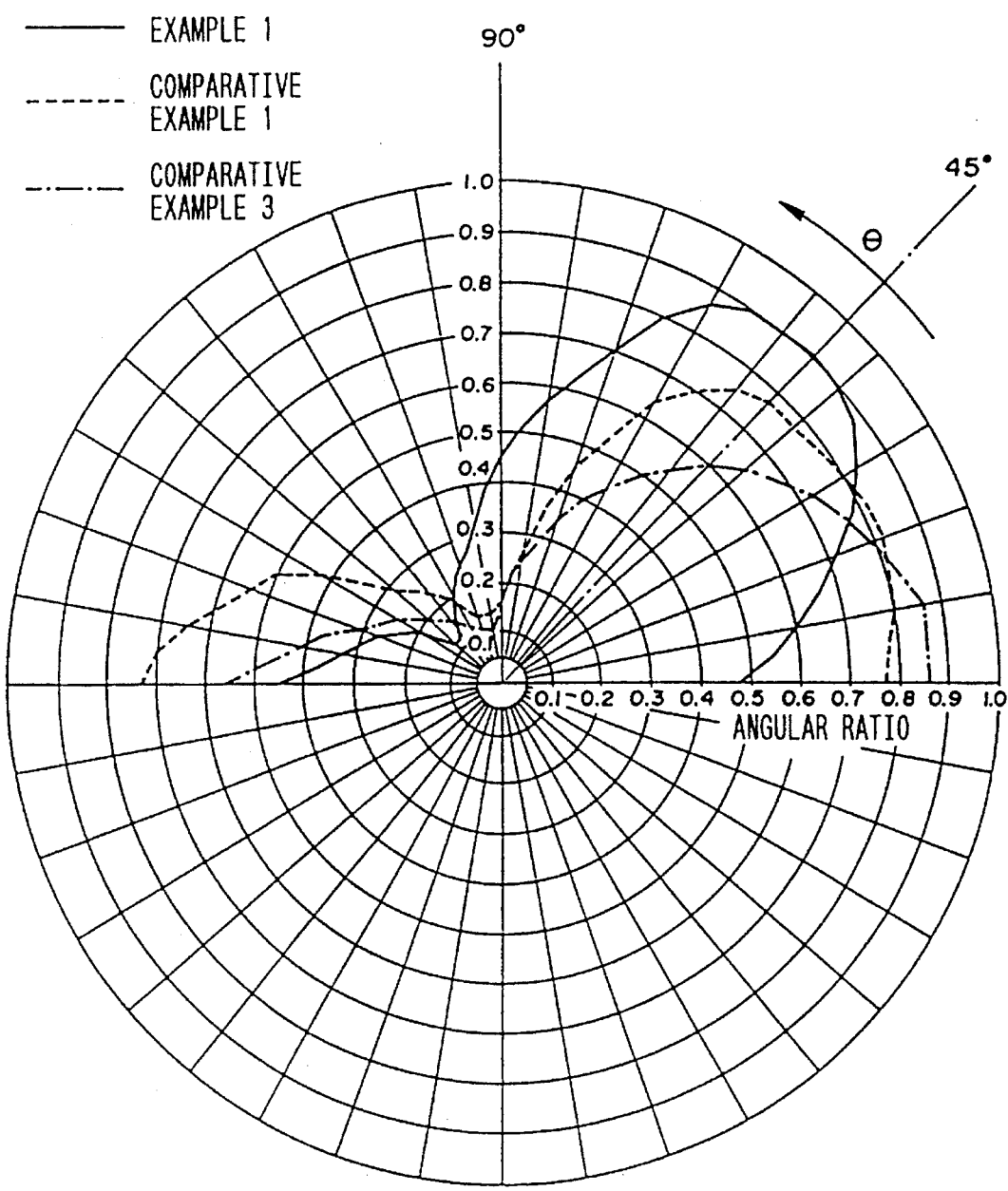
FIG. 9 is a graph showing angle distributions (in the case of magnetic composition α) of angular ratios in 45° magnetic recording media.
Figure 10:
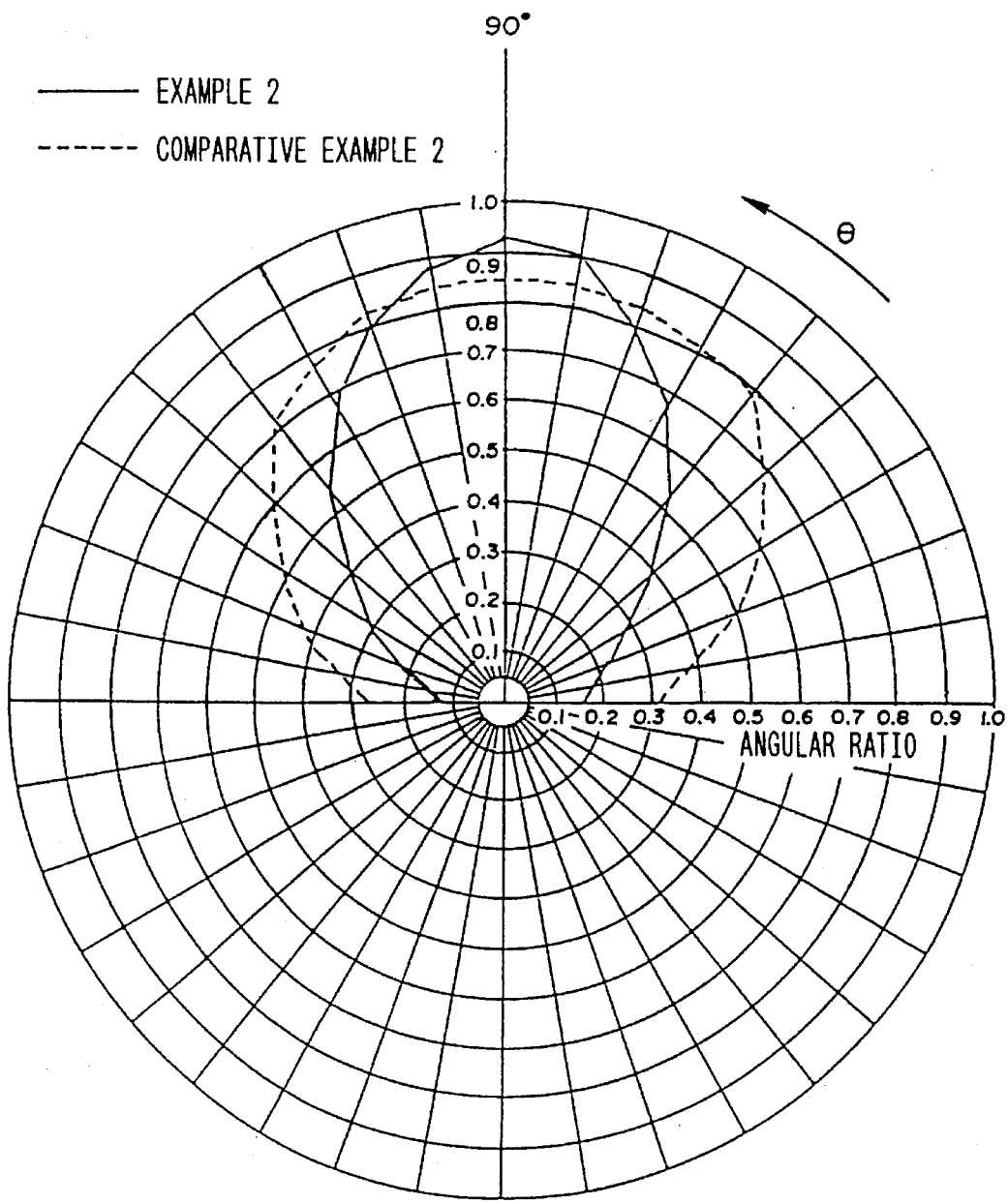
FIG. 10 is a graph showing angle distributions (in the case of magnetic composition β) of angular ratios in perpendicular magnetic recording media.
Figure 11:
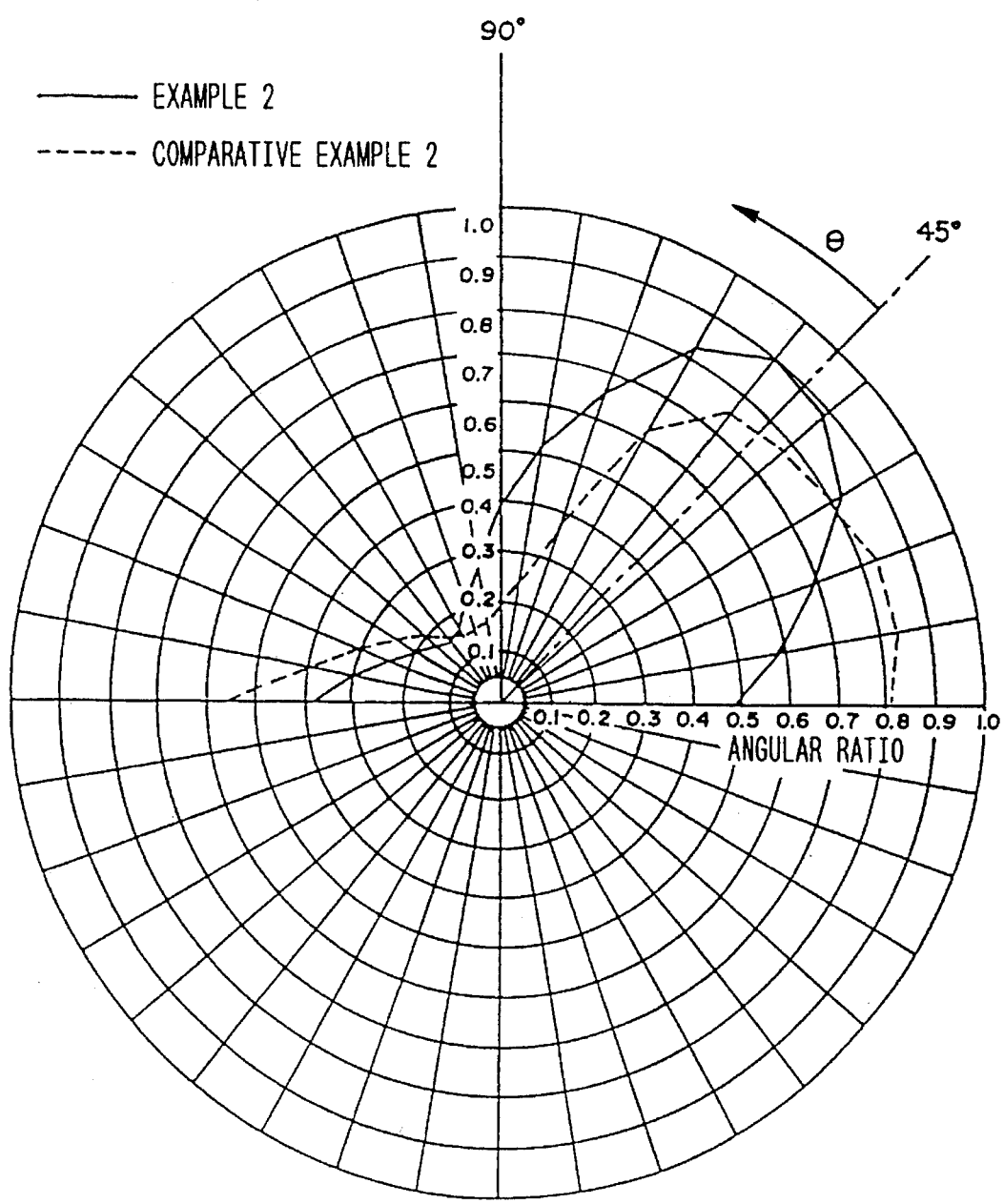
FIG. 11 is a graph showing angle distributions (in the case of magnetic composition β) of angular ratios in 45° magnetic recording media.

After coating compositions used for forming an undercoat non-magnetic layer and an overcoat magnetic layer were prepared in the same manner as Example 1 and subjected to measurement of viscosity, a known method for production of a perpendicular magnetic recording medium as shown in FIG. 7 was used. The coating compositions were simultaneously multiply applied to a support of polyethylene terephthalate having a thickness of 7 μm and a center line surface roughness of 0.5 μm so that an undercoat non-magnetic layer having a thickness of 2 μm after drying was formed just before an overcoat magnetic layer having a thickness of 0.3 μm after drying was formed thereon. In the condition where the two layers were not yet hardened, the two layers were dried while magnetic fields produced by an orientation-purpose dipole permanent magnet set to form vertical angles θ of 90 degrees and 45 degrees and having a magnetic field intensity of 3600 gausses to provide vertical components were respectively applied thereto, thus to prepare a perpendicular magnetic recording medium and a 45° oblique orientation magnetic recording medium.

Table 20 show the viscosity of each undercoat non-magnetic composition, the fundamental viscosity of each overcoat magnetic composition and combinations of magnetic compositions and non-magnetic compositions in the examples and comparative examples.

Table 20

The vertical distributions of angular ratios in the magnetic recording media produced in the examples 1 and 2 and comparative examples 1, 2 and 3 were measured and compared. The measurements were performed at intervals of an angle of 5° through application of magnetic field intensity of 5 kOe (kilo-oersted) by using a vibrating sample type magnetometer VSM made by Toei Kogyo Co. Ltd.

Results are shown in FIGS. 8 through 11.

As is obvious from the results of measurements of angle distributions of angular ratios shown in FIGS. 8 through 11, the example 1 according to the present invention is greatly superior to the comparative example 3 both in the perpendicular magnetic recording medium and in the 45° oblique orientation magnetic recording medium. Furthermore, it is apparent from the comparison between the example 1 and the comparative example 1 that a more remarkable effect can be obtained when the viscosity of the non-magnetic composition is higher than the fundamental viscosity of the magnetic composition. Furthermore, it is apparent from the results of the example 2 and the comparative example 2 that the viscosity of the non-magnetic composition is preferably not lower than 10 poises.

TABLE 20

Combinations of Magnetic Composition and Undercoat Non-magnetic Composition in Examples and Comparative Examples

| Magentic composition | Composition A liquid viscosity 22 poises | Composition B liquid viscosity 10 poises | Composition C liquid viscosity 8 poises |
|---|---|---|---|
| Composition α fundamental viscosity 18 poises | Example 1 Comparative Example 3 | Comparative example 1 | — |
| Composition β fundamental viscosity 6 poises | — | Example 2 | Comparative Example 2 |

What is claimed is:
1. A method for producing a magnetic recording medium, comprising the following steps:
applying a lower non-magnetic layer and an upper magnetic layer onto a non-magnetic support, said upper magnetic layer including elongate ferromagnetic par- ticles which are elongate along a major axis thereof, each of said layers being at least partially wet, wherein said lower layer has a viscosity which is greater than a viscosity of said upper layer absent said ferromagnetic particles;

generating a magnetic field which extends across said support at an angle selected from a range of 10 degrees to 90 degrees, inclusive, with respect to a surface of said support onto which said lower non-magnetic layer is applied so that each of said ferromagnetic particles is oriented with said major axis extending at said selected angle and each of said ferromagnetic particles is attracted into said lower non-magnetic layer, so that said ferromagnetic particles have lower end portions embedded in said lower non-magnetic layer, wherein the viscosity of said lower layer during said generating is not lower than 10 poise; and drying each of said layers.

2. The method of claim 1, wherein said generating step is conducted prior to said drying step.

3. The method of claim 1, wherein said generating step includes the step of generating said magnetic field with a magnet provided only on a support side of said magnetic medium.

4. A method for producing a magnetic recording medium comprising the steps of:

applying a lower non-magnetic layer, an intermediate non-magnetic layer and an upper magnetic layer onto a non-magnetic support, said intermediate layer being applied between said lower and upper layers after applying said lower layer and before applying said upper layer, said upper magnetic layer including ferromagnetic particles which are elongate along a major axis thereof, each of said layers being partially wet, wherein said intermediate layer has a viscosity which is greater than a viscosity of said upper layer absent said ferromagnetic particles;

generating a magnetic field which extends across said support at an angle selected from a range of 10 degrees to 90 degrees with respect to a surface of said support onto which said lower non-magnetic layer is applied so that each of said ferromagnetic particles is oriented with said major axis extending at said selected angle and each of said ferromagnetic particles is attracted into said intermediate non-magnetic layer, so that said ferromagnetic particles have lower end portions embedded in said intermediate non-magnetic layer, wherein the viscosity of said intermediate layer is not less than 20 poise during said generating; and drying each of said layers.

5. The method of claim 4, wherein said generating step includes the step of providing magnets on opposite sides of said support, said magnets in combination generating said magnetic field.

6. The method of claim 4, wherein said generating step is conducted during said drying step.

7. The method of claim 4, wherein said lower layer includes inorganic powder and resin and said intermediate layer includes resin.

* * * * *